US008357474B2

(12) United States Patent
Narendar et al.

(10) Patent No.: US 8,357,474 B2
(45) Date of Patent: Jan. 22, 2013

(54) CO-DOPED YSZ ELECTROLYTES FOR SOLID OXIDE FUEL CELL STACKS

(75) Inventors: Yeshwanth Narendar, Westford, MA (US); Guangyong Lin, Shrewsbury, MA (US); Aravind Mohanram, Shrewsbury, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 485 days.

(21) Appl. No.: 12/653,661

(22) Filed: Dec. 16, 2009

(65) Prior Publication Data

US 2010/0167170 A1 Jul. 1, 2010

Related U.S. Application Data

(60) Provisional application No. 61/201,977, filed on Dec. 17, 2008.

(51) Int. Cl.
*H01M 8/10* (2006.01)
(52) U.S. Cl. ........ 429/465; 429/477; 429/479; 429/496; 429/535
(58) Field of Classification Search .................. 429/464, 429/465, 468, 472, 475, 477, 479, 496, 535
See application file for complete search history.

(56) References Cited

U.S. PATENT DOCUMENTS

| 5,376,472 | A | 12/1994 | Hartvigsen et al. |
|---|---|---|---|
| 5,521,490 | A | 5/1996 | Manohar |
| 6,692,855 | B1 | 2/2004 | Aizawa et al. |
| 2003/0151156 | A1 | 8/2003 | Crumm et al. |
| 2003/0215712 | A1* | 11/2003 | Feddrix et al. ................ 429/224 |
| 2004/0013924 | A1 | 1/2004 | Park et al. |
| 2005/0016839 | A1 | 1/2005 | Horne et al. |
| 2005/0026030 | A1 | 2/2005 | Mardilovich et al. |
| 2005/0214613 | A1 | 9/2005 | Sarkar et al. |
| 2007/0021292 | A1* | 1/2007 | Maki et al. .................... 501/153 |
| 2007/0049484 | A1* | 3/2007 | Kear et al. .................... 501/103 |
| 2007/0154762 | A1* | 7/2007 | Schucker ........................ 429/33 |
| 2007/0176332 | A1* | 8/2007 | Swartzlander et al. ....... 264/618 |
| 2007/0178366 | A1 | 8/2007 | Mahoney et al. |
| 2007/0264189 | A1* | 11/2007 | Adzic et al. .................. 423/604 |
| 2008/0219918 | A1* | 9/2008 | Lee et al. ................... 423/648.1 |

OTHER PUBLICATIONS

Sakka et al. (Fabrication of high-strain rate superplastic yttria-doped zirconia polycrystals by adding manganese and aluminum oxides; Journal of the European Ceramic Society 24 (2004) 449-443).*
Appel, C.C., et al., "Ageing Behaviour of Zirconia Stabilised by Yttria and Manganese Oxide," *Journal of Materials Science*, 36:4493-4501, (2001).
Bayer, G., "Stabilization of Cubic $ZrO_2$ by MnO and Partial Substitution of Ti, Nb, or Ta for Zr," *Journal of the American Ceramic Society-Discussions and Notes*, 53(5): p. 294, (1970).
Guo, X. and Yuan, R., "Roles of Alumina in Zirconia-Based Solid Electrolyte," *Journal of Materials Science*, 30:923-931, (1995).

(Continued)

*Primary Examiner* — Patrick Ryan
*Assistant Examiner* — Ben Lewis
(74) *Attorney, Agent, or Firm* — Robert T. Conway; Abel Law Group, LLP

(57) ABSTRACT

A solid oxide fuel cell electrolyte is fabricated by combining an yttria-stabilized zirconia powder with $\alpha$-$Al_2O_3$ having a $d_{50}$ particle size in a range of between about 10 nm and about 200 nm and $Mn_2O_3$ to form an electrolyte precursor composition, and then sintering the electrolyte precursor composition to thereby form the electrolyte. The $\alpha$-$Al_2O_3$ and $Mn_2O_3$ can be present in the electrolyte precursor composition in an amount in a range of between about 0.25 mol % and about 5 mol %. The electrolyte can be a component of a solid oxide fuel cell of the invention.

17 Claims, 17 Drawing Sheets

OTHER PUBLICATIONS

Hotza, D., et al., "Effect of Nano-$Al_2O_3$ Addition on the Densification of YSZ Electrolytes," *Journal of Nano Research*, 6:115-122, (2009).

Ji, Y., et al., "Study on the Properties of $Al_2O_3$-doped $(ZrO_2)_{0.92}(Y_2O_3)_{0.08}$ Electrolyte," *Solid State Ionics*, 126:277-283, (1999).

Miyayama, M. and Yanagida, H., "Effects of $Al_2O_3$ Additions on Resistivity and Microstructure of Yttria-Stabilized Zirconia," *Am. Ceram. Soc. Bull.*, 65(4):660-664, (1986).

Radford, K.C. and Bratton, R.J., "Zirconia Electrolyte Cells Part 1 Sintering Studies," *Journal of Materials Science*, 14:59-65, (1979).

Radford, K.C. and Bratton, R.J., "Zirconia Electrolyte Cells Part 2 Electrical Properties," *Journal of Materials Science*, 14:66-69, (1979).

Sakka, Y., et al., "Fabrication of High-Strain Rate Superplastic Yttria-Doped Zirconia Polycrystals by Adding Manganese and Aluminum Oxides," *Journal of the European Ceramic Society*, 24:449-453, (2004).

Van Herle, J. and Vasquez, R., "Conductivity of Mn and Ni-Doped Stabilized Zirconia Electrolyte," *Journal of the European Ceramic Society*, 24:1177-1180, (2004).

Verkerk, M.J., et al., "Effect of Impurities on Sintering and Conductivity of Yttria-Stabilized Zirconia," *Journal of Materials Science*, 17:3113-3122, (1982).

Wakai, F., et al., "Superplasticity of Transition Metal Oxide-Doped Y-TZP at Low Temperatures," *Proce. $1^{st}$ Japan International SAMPLE Symposium*, pp. 267-271, (1989).

Zhang, T.S., et al., "Effect of Mn Addition on the Densification, Grain Growth and Ionic Conductivity of Pure and $SiO_2$-Containing 8YSZ Electrolytes," *Solid State Ionics*, 180:82-89, (2009).

Transmittal of International Preliminary Report on Patentability and Written Opinion, International Application No. PCT/US2009/068253 mailed on Jun. 30, 2011.

Notification of Transmittal of the International Search Report and the Written Opinion of the International Searching Authority, or the Declaration, International Application No. PCT/US2009/068253, date of mailing, Jul. 29, 2010.

\* cited by examiner (a)

(b)

(a)

(b)

(c)

(d)

CO-DOPED YSZ ELECTROLYTES FOR SOLID OXIDE FUEL CELL STACKS

RELATED APPLICATION

This application claims the benefit of U.S. Provisional Application No. 61/201,977, filed on Dec. 17, 2008.

The entire teachings of the above application are incorporated herein by reference.

BACKGROUND OF THE INVENTION

A fuel cell is a device that generates electricity by a chemical reaction. Among various fuel cells, solid oxide fuel cells use a hard, ceramic compound metal (e.g., calcium or zirconium) oxide as an electrolyte. Typically, in solid oxide fuel cells, an oxygen gas, such as $O_2$, is reduced to oxygen ions ($O^{2-}$) at the cathode, and a fuel gas, such as $H_2$ gas, is oxidized with the oxygen ions to form water at the anode. Fuel cells are generally designed as stacks, whereby subassemblies, each including a cathode, an anode and a solid electrolyte between the cathode and the anode, are assembled in series by locating an electrical interconnect between the cathode of one subassembly and the anode of another.

Zirconia stabilized by 8 mol % yttria (YSZ), such as, for example, from Tosoh (Tosoh USA, Grove City, Ohio), or from Unitec Ceramics (Stafford, United Kingdom), or from Daiichi Kigenso Kagaku Kogyo (Osaka, Japan) is commonly used as the electrolyte of solid oxide fuel cells (SOFCs) as it has a high oxygen ion conductivity and is quite stable in both oxidant and fuel atmospheres. A preferred YSZ is TZ-8Y powder from Tosoh USA. However, its high sintering temperature (about 1377° C. for TZ-8Y) limits its application in some areas such as co-firing multiple layers in the cell level and/or multiple cells in the stack level.

Therefore, a new approach is needed to minimize or eliminate the above mentioned problems.

SUMMARY OF THE INVENTION

This invention generally is directed to a method of reducing the sintering temperature and modifying the sintering behavior of a YSZ electrolyte by co-doping $\alpha$-$Al_2O_3$ having a $d_{50}$ particle size in a range of between about 10 nm and about 200 nm, and $Mn_2O_3$ (each independently in a range of between about 0.25 mol % and about 5 mol %) so as to improve the performance of SOFCs and reduce the cost of the SOFC stack manufacture.

In one embodiment, the invention is directed to a method for forming an electrolyte of a solid oxide fuel cell that includes the steps of combining an yttria-stabilized zirconia powder with $\alpha$-$Al_2O_3$ and $Mn_2O_3$ to form an electrolyte precursor composition, and sintering the electrolyte precursor composition to thereby form the electrolyte. The $\alpha$-$Al_2O_3$ and $Mn_2O_3$ can be present in the electrolyte precursor composition in an amount in a range of between about 0.25 mol % and about 5 mol %. In a specific embodiment, the $\alpha$-$Al_2O_3$ and $Mn_2O_3$ is present in the electrolyte precursor in an amount of about 2 mol %. In some embodiments, the composition of the yttria-stabilized zirconia powder includes at least one of: yttria in an amount between about 3% and about 10 mol % of the powder; and zirconia in an amount in a range of between about 90 mol % and about 97 mol % of the powder. In a specific embodiment, yttria is present in the yttria-stabilized zirconia powder in an amount of about 8 mol %.

In some embodiments, the $d_{50}$ particle size of the yttria-stabilized zirconia powder is in a range of between about 0.05 µm and about 1 µm. The ratio of $\alpha$-$Al_2O_3$:$Mn_2O_3$ can be in a range of between about 0.25:1 and about 1:0.25. The $d_{50}$ of the $\alpha$-$Al_2O_3$ can be in a range of between about 10 nm and about 200 nm. In a specific embodiment, the $d_{50}$ of the $\alpha$-$Al_2O_3$ is about 50 nm. The specific surface area of $\alpha$-$Al_2O_3$ can be in a range of between about 5 $m^2$/g and about 30 $m^2$/g. In a specific embodiment, the specific surface area of the $\alpha$-$Al_2O_3$ is about 17 $m^2$/g. The $d_{50}$ of the $Mn_2O_3$ can be in a range of between about 50 nm and about 400 nm. In a specific embodiment, the $d_{50}$ of the $Mn_2O_3$ is about 200 nm. The specific surface area of the $Mn_2O_3$ can be in a range of between about 10 $m^2$/g and about 50 $m^2$/g. In a specific embodiment, the specific surface area of $Mn_2O_3$ is about 32 $m^2$/g. The $d_{50}$ of the yttria-stabilized zirconia (YSZ) powder can be in a range of between about 50 nm and about 1000 nm. In a specific embodiment, the $d_{50}$ of the YSZ is about 250 nm. The specific surface area of the YSZ can be in a range of between about 5 $m^2$ g and about 30 $m^2$/g. In a specific embodiment, the specific surface area of the YSZ is about 13 $m^2$/g.

In another embodiment, the invention is directed to an electrolyte of a solid oxide fuel cell that is doped with $\alpha$-$Al_2O_3$ and $Mn_2O_3$. In yet another embodiment, the invention is directed to a solid oxide fuel cell that includes an electrolyte component doped with $\alpha$-$Al_2O_3$ and $Mn_2O_3$.

This invention has many advantages, including a reduction in the peak temperature ($T_{max}$) from about 1377° C. for pure YSZ to about 1226° C. for 2.0 mol % $\alpha$-$Al_2O_3$+$Mn_2O_3$. Furthermore, dilatometry dL/dT full width half maximum (FWHM) was increased from about 181° C. for pure YSZ to about 281° C. for 2.0 mol % $\alpha$-$Al_2O_3$+$Mn_2O_3$. In addition, co-doping $\alpha$-$Al_2O_3$+$Mn_2O_3$ showed improved relative density (up to 6% improvement) with the same hot pressing procedure compared to $\alpha$-$Al_2O_3$-doping and $Mn_2O_3$-doping. These properties enable the production of improved SOFC stacks.

BRIEF DESCRIPTION OF THE DRAWINGS

The foregoing will be apparent from the following more particular description of example embodiments of the invention, as illustrated in the accompanying drawings. The drawings are not necessarily to scale, emphasis instead being placed upon illustrating embodiments of the present invention.

DETAILED DESCRIPTION OF THE INVENTION

Figure 1:
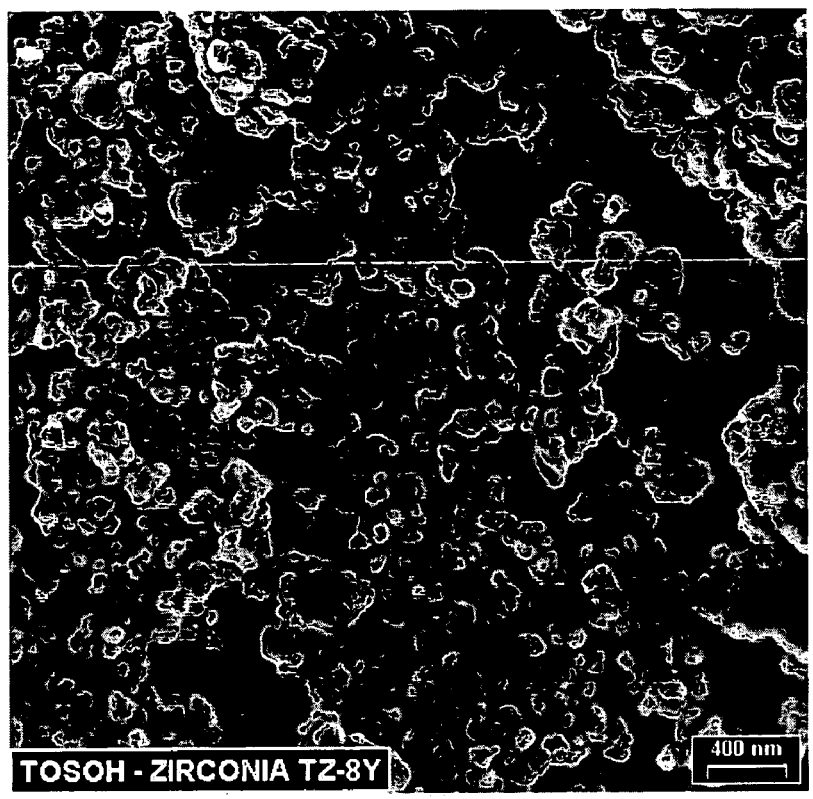
FIG. 1 is an SEM photograph showing the particle size of Tosoh TY-8Y powder.

A description of example embodiments of the invention follows.

Zirconia stabilized by 8 mol % yttria (YSZ), such as, for example, from Tosoh (Tosoh USA, Grove City, Ohio), or from Unitec Ceramics (Stafford, United Kingdom), or from Daiichi Kigenso Kagaku Kogyo (Osaka, Japan) is commonly used as the electrolyte of solid oxide fuel cells (SOFCs) as it has a high oxygen ion conductivity and is quite stable in both oxidant and fuel atmospheres. A preferred YSZ is TZ-8Y powder from Tosoh USA. However, its high sintering temperature (about 1377° C. for TZ-8Y) limits its application in some areas such as co-firing multiple layers in the cell level and/or multiple cells in the stack level.

The invention generally is directed to a method of reducing the sintering temperature and modifying the sintering behavior of the YSZ electrolyte by doping ultrafine-α-$Al_2O_3$, having a $d_{50}$ particle size in a range of between about 10 nm and about 200 nm, and $Mn_2O_3$, and/or co-doping α-$Al_2O_3$+$Mn_2O_3$ so as to improve the performance of SOFCs and reduce the cost of the SOFC stack manufacture.

Doping α-$Al_2O_3$, $Mn_2O_3$, and $CO_3O_4$ into YSZ can significantly improve the sintering behavior by reducing the sintering temperature. NiO also reduces the sintering temperature of YSZ, but not as much as $Mn_2O_3$. Y. Ji, J. Liu, Z. Lu, X. Zhao, T. He, and W. Su, *Study on the properties of $Al_2O_3$-doped $(ZrO_2)_{0.92}(Y_2O_3)_{0.08}$ electrolyte*, Solid State Ionics 126 (1999) 277-283. It is known that there is a compensating effect of co-doping $Mn_2O_3$ and $CO_3O_4$ in both sintering and electrical properties. It has been shown that Mn decreases the electronic conductivity of YSZ, while Co increases it. Cells with $CO_3O_4$ doped and/or $Mn_2O_3$ and $CO_3O_4$ co-doped YSZ as the electrolytes show very low open circuit voltages (OCV), and therefore $CO_3O_4$ is not a preferred dopant. Co-doping α-$Al_2O_3$ and $Mn_2O_3$ reduces the sintering temperature and improves the sintering behavior of the YSZ electrolyte more than does single-doping α-$Al_2O_3$ and $Mn_2O_3$.

The sintering temperature and densification behavior of 8 mol % yttria stabilized zirconia (YSZ) can be significantly reduced and modified by adding one or two ultrafine cation dopants in a conventional ceramic process. A small amount (in a range of between about 0.25 mol % and about 5 mol %) of ultrafine (having a $d_{50}$ particle size in a range between about 10 nm and about 200 nm, preferably about 50 nm median particle diameter) α-$Al_2O_3$, $Mn_2O_3$ doping, and α-$Al_2O_3$+$Mn_2O_3$ co-doping can significantly reduce the peak temperature of the shrinkage (dL/dT) curve (over 200° C. with 0.5 mol % α-$Al_2O_3$+1.5 mol % $Mn_2O_3$ co-doping) and the maximum shrinkage rate of YSZ. However, the dopants typically do not significantly increase the electronic conductivity of YSZ, such as, for example, Tosoh TZ-8Y. Therefore, the open circuit voltage of cells using the doped YSZ as the electrolytes generally will be as good as using undoped YSZ. It becomes possible to densify the YSZ electrolyte at 1150~1200° C. with α-$Al_2O_3$+$Mn_2O_3$ co-doping.

Sintering temperature is significantly reduced and sintering behavior of the YSZ electrolyte is modified by co-doping a small amount of ultrafine-α-$Al_2O_3$+$Mn_2O_3$ so as to improve the performance of SOFC's and reduce the cost of the SOFC stack manufacture.

Exemplification

Three powders, Tosoh TZ-8Y (YSZ) (Tosoh USA, Grove City, Ohio), ultrafine α-$Al_2O_3$ from Greens and Powders (G&P) group of Saint-Gobain High Performance Materials, and $Mn_2O_3$ from Alfa Aesar (Ward Hill, Mass.) were selected as the starting materials in this study. SEM and laser light scattering were used to characterize the as-received materials and those after attrition milling. The particle sizes were obtained by laser scattering measurements with a Partica LA-950 laser from Horiba (Horiba Instruments, Inc., Irvine, Calif.). The compositions of the powder mixtures that were prepared are shown in Table 1. Deionized (DI) water with a pH value of 3 (acidified with nitric acid), ethanol, and DI water with 3 wt % of Darvan C (R. T. Vanderbilt, Inc., Norwalk, Conn.) as the dispersant plus 3 minutes ultrasonic treatment were three techniques used to optimize dispersing ultrafine α-$Al_2O_3$ in YSZ. Then, the optimized technique were used to mix $Mn_2O_3$ doped YSZ and α-$Al_2O_3$+$Mn_2O_3$ co-doped YSZ powders. The sintering behaviors of the three doped YSZ series were studied by pressureless sintering, dilatometry, and hot pressing. Densities of doped YSZ samples were measured for the free sintering samples by the Archimedes method that is well known in the art, and image analysis (IA) processing by SEM and/or dimension shrinkage calculation by a laser for the hot pressed samples.

Also, the total and electronic conductivities of selected compositions of the three doped YSZ series were measured by a two-probe technique. The open circuit voltages (OCV) of symmetric cells using undoped YSZ and some doped YSZs as the electrolytes were measured at 800, 900, and 1,000° C. with Pt paste as the electrodes, humidified hydrogen as the fuel and air as the oxidant.

Results and Discussion

Materials Characterizations

Figure 2:
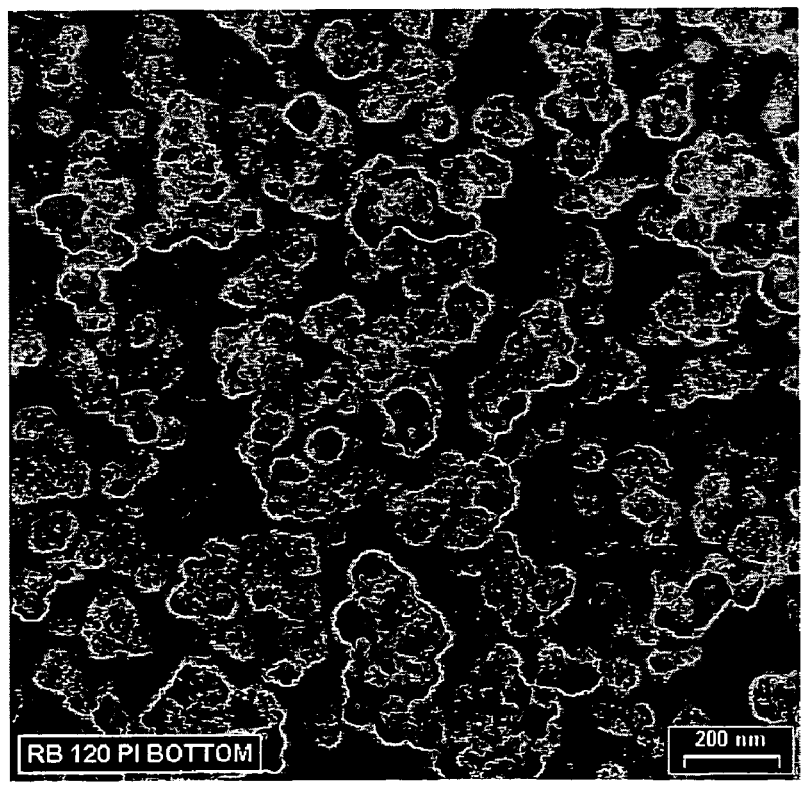
FIG. 2 is an SEM photograph showing the particle size of ultrafine $\alpha$-$Al_2O_3$ (provided by Saint-Gobain (SG) Greens and Powders Group).
Figure 3:
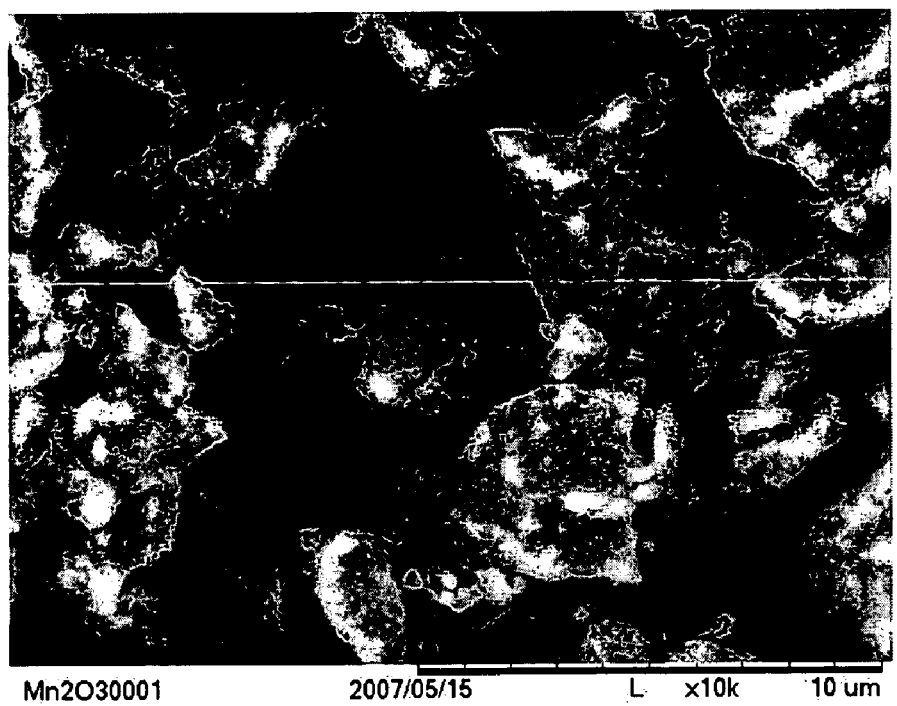
FIGS. 3A-B are SEM photographs showing the particle sizes of (A) as-received $Mn_2O_3$ and (B) after attrition milling for 42 hrs.
Figure 3:
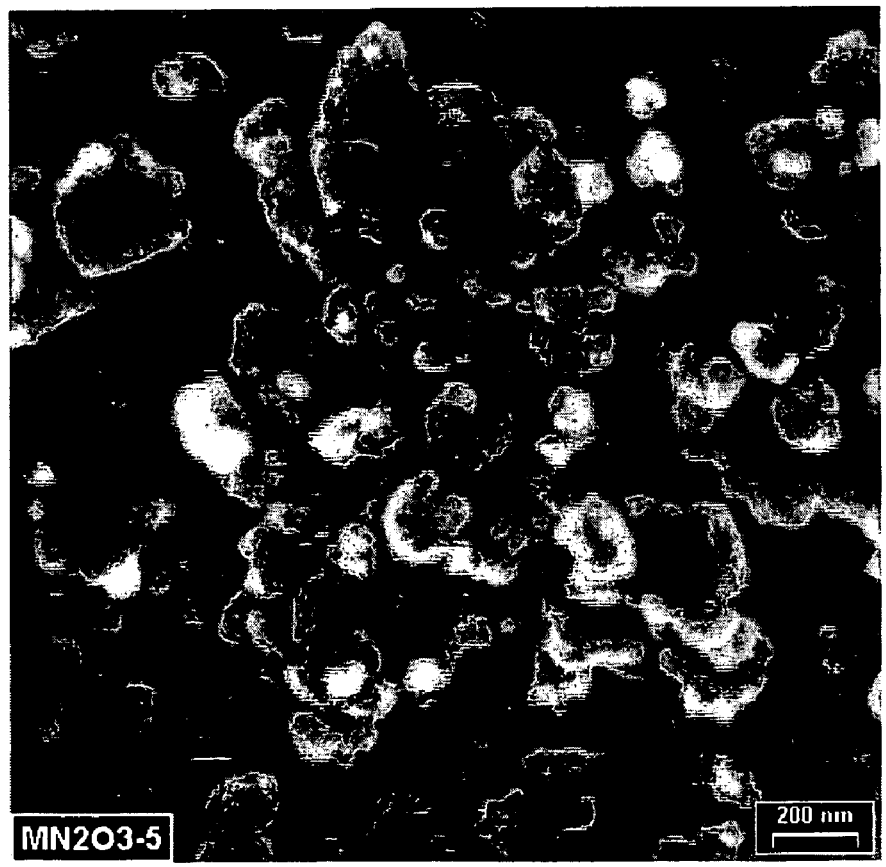
Figure 4:
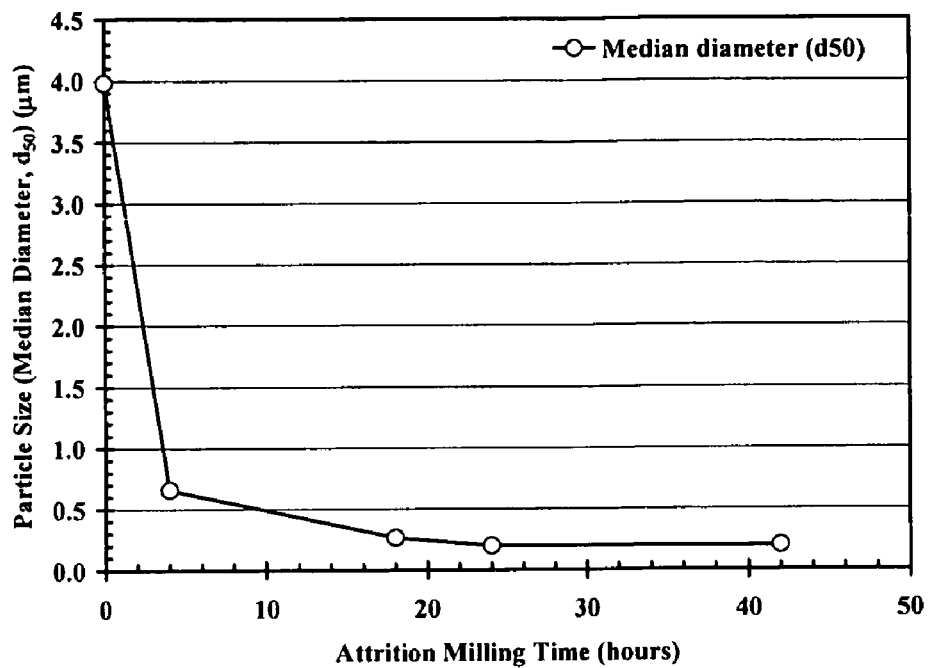
FIGS. 4A-B are graphs of the median particle diameter ($d_{50}$) of $Mn_2O_3$ after attrition milling measured with laser light scattering. (A) The median diameter ($d_{50}$) of $Mn_2O_3$ after attrition milling with changing milling media from d=2.0 mm for 4 hrs to d=0.3 mm for 38 hrs. (B) The median diameter ($d_{50}$) of $Mn_2O_3$ after attrition milling using milling media of d=2.0 mm for 30 hrs.
Figure 4:
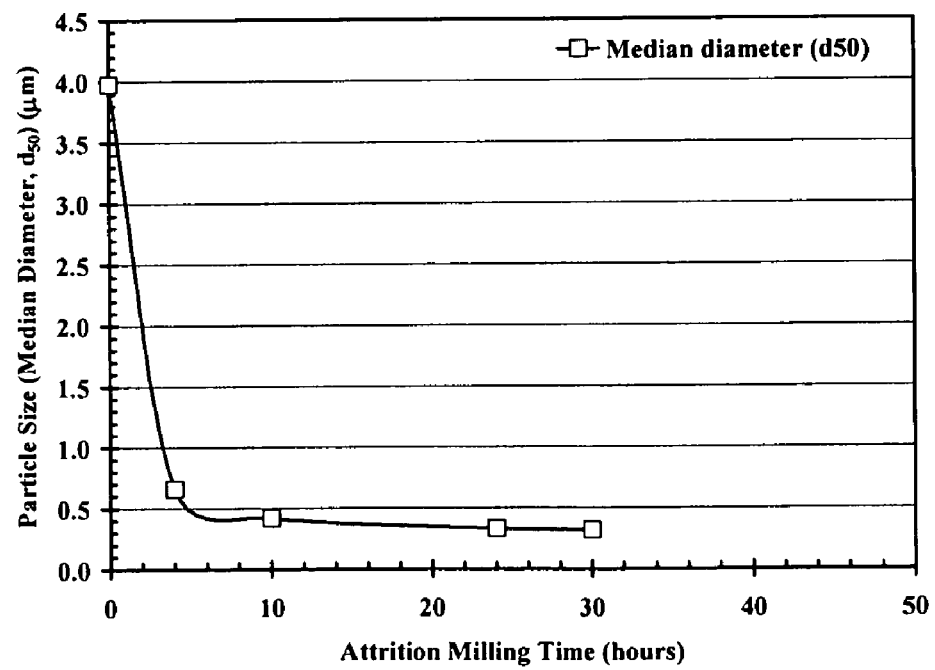

The SEM and laser scattering results (as shown in FIGS. 1 to 3) showed that the YSZ powder had a specific surface area (SSA) of 12.99 $m^2/g$ and a median particle size ($d_{50}$) of 0.25 μm (FIG. 1); ultrafine-α-$Al_2O_3$ powder had an SSA of 16.8 $m^2/g$ and a $d_{50}$ of 50 nm (data and picture were provided by G&P as shown in FIG. 2); $Mn_2O_3$ powder had an SSA of 1.04 $m^2/g$ and a $d_{50}$ of 3.98 μm (FIG. 3(a)). The as-received ultrafine-α-$Al_2O_3$ powder was ready to dope YSZ powder while the as-received $Mn_2O_3$ powder was refined further by attrition milling. The as-received $Mn_2O_3$ powder was attrition-milled at a ratio of 10:1:2 for media:solid:vehicle (DI water) and a speed of 500 rpm to reduce the particle size. Samples were collected after different milling periods to measure the particle size distribution by laser light scattering using a Partica LA-950 from Horiba Co. (Horiba Instruments, Inc., Irvine, Calif.). FIG. 4(a) showed that the median particle size ($d_{50}$) of $Mn_2O_3$ could be reduced from as-received 4.0 μm to 0.2 μm after 24 hours attrition milling, but it was not reduced more by 18 more hours milling with the same condition. The specific surface area (SSA) of $Mn_2O_3$ was increased from 1.04 $m^2/g$ to 31.59 $m^2/g$ after attrition milling. The $ZrO_2$ milling media was changed from d=2.0 mm after 4 hrs milling to d=0.3 mm during the rest of attrition milling. Alternatively, a $d_{50}$ of 0.32 μm and an SSA of 26.19 $m^2/g$ of $Mn_2O_3$ could be obtained after 30 hrs attrition milling using the $ZrO_2$ milling media of d=2.0 mm, as shown in FIG. 4(b). The $Mn_2O_3$ powder with a $d_{50}$ of 0.2 μm and an SSA of 31.59 $m^2/g$ was used to dope YSZ for the sintering study, although it was larger than the expected particle size (a $d_{50}$ of 0.1 μm). FIG. 3(b) showed the particle size of $Mn_2O_3$ after attrition milling for 42 hours.

TABLE 1

Compositions of YSZ powders doped with ultrafine-α-$Al_2O_3$ and $Mn_2O_3$

| Sample No. | Dopant | Dopant mol. % | Dopant wt. % | YSZ wt. % |
|---|---|---|---|---|
| 0 | | 0 | 0 | 100 wt. % |
| 0.2 | α-$Al_2O_3$ | 0.2 | 0.1557 | 99.8443 |
| 1 | α-$Al_2O_3$ | 0.5 | 0.3883 | 99.6117 |
| 2 | α-$Al_2O_3$ | 1 | 0.7775 | 99.2225 |
| 3 | α-$Al_2O_3$ | 1.5 | 1.1676 | 98.8324 |
| 4 | α-$Al_2O_3$ | 2 | 1.5586 | 98.4414 |
| 5 | $Mn_2O_3$ | 0.25 | 0.3002 | 99.6998 |
| 6 | $Mn_2O_3$ | 0.5 | 0.6000 | 99.4000 |
| 7 | $Mn_2O_3$ | 1 | 1.1989 | 98.8011 |
| 8 | $Mn_2O_3$ | 1.5 | 1.7965 | 98.2035 |
| 9 | $Mn_2O_3$ | 2 | 2.3929 | 97.6071 |
| | Co-doped 50%/50% of | | | |
| 10 | α-$Al_2O_3$ | 0.25 | 0.1940 | 99.5057 |
| | $Mn_2O_3$ | 0.25 | 0.3003 | |
| 11 | α-$Al_2O_3$ | 0.5 | 0.3879 | 99.0114 |
| | $Mn_2O_3$ | 0.5 | 0.6007 | |
| 12 | α-$Al_2O_3$ | 0.75 | 0.5819 | 98.5170 |
| | $Mn_2O_3$ | 0.75 | 0.9011 | |
| 13 | α-$Al_2O_3$ | 1 | 0.7760 | 98.0225 |
| | $Mn_2O_3$ | 1 | 1.2015 | |
| 14 | α-$Al_2O_3$ | 0.5 | 0.3875 | 98.4123 |
| | $Mn_2O_3$ | 1.0 | 1.2002 | |
| 15 | α-$Al_2O_3$ | 0.5 | 0.3872 | 97.8144 |
| | $Mn_2O_3$ | 1.5 | 1.7985 | |

3.2. Optimizing the Technique for Mixing Ultrafine $Al_2O_3$ and YSZ powder

Figure 5:
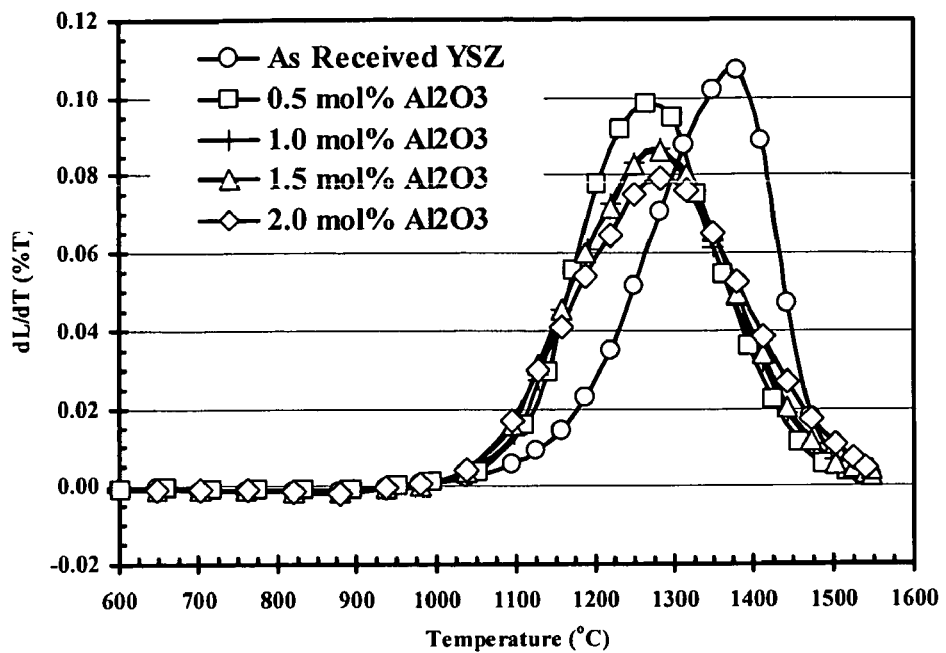
FIG. 5 is a graph of the shrinkage rate of TZ-8Y doped with SG ultrafine-$\alpha$-$Al_2O_3$ as measured by dilatometry using water at a pH value of 3 (acidified with nitric acid) for mixing with binders.
Figure 6:
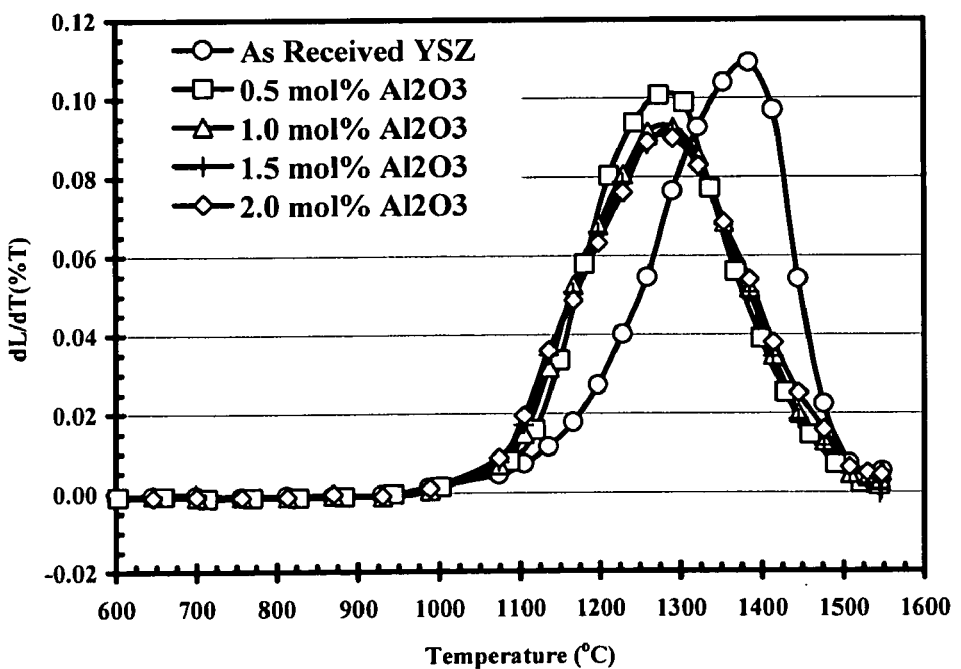
FIG. 6 is a graph of the shrinkage rate of TZ-8Y doped with SG ultrafine-$\alpha$-$Al_2O_3$ as measured by dilatometry using ethanol for mixing without binders.

DI water with a pH value of 3 (acidified with nitric acid), ethanol, and DI water with 3 wt % of Darvan® C as the dispersant plus 3 minutes ultrasonic treatment were respectively used to optimize the technique for dispersing ultrafine-$Al_2O_3$. FIG. 5 shows the first derivative of the shrinkage curves as measured by dilatometry for powder mixtures prepared with 0.0, 0.5, 1.0, 1.5, 2.0 mol % α-$Al_2O_3$ added to YSZ using DI water at a pH value of 3 (acidified with nitric acid) for mixing. α-$Al_2O_3$ and YSZ powders were added into the DI water at the same time and ball milled for 24 hrs, followed by addition of binders which were used to improve die-pressing, which were added one hour before the end of ball milling. A similar result has been achieved when using a $d_{50}$ of 0.3 μm $Al_2O_3$ as the dopant. The onset of sintering was basically unchanged by α-$Al_2O_3$ doping, but the increase in the shrinkage rate with temperature occurred much faster, compared to the undoped YSZ. As a result, the peak temperature of the (dL/dT) curve was reduced by 100° C., compared to 80° C. when using a $d_{50}$ of 0.3 μm α-$Al_2O_3$. The peak sintering temperature was almost unchanged over the four dopant levels tested. This is most likely due to the low solubility limit of α-$Al_2O_3$ in YSZ. The magnitude of the $(dL/dT)_{max}$ showed an inverse relationship with α-$Al_2O_3$ dopant level and is lower than the $(dL/dT)_{max}$ obtained using a $d_{50}$ of 0.3 μm α-$Al_2O_3$. As shown in FIGS. 5 and 6, the (dL/dT) curves became broader when using ultrafine-α-$Al_2O_3$ doping. FIG. 6 shows the (dL/dT) curves of ultrafine-α-$Al_2O_3$ doped YSZ powder mixtures of the same composition as shown in FIG. 5 but using ethanol for mixing (ball milling for 24 hrs) without adding binders. The two figures demonstrated similar sintering behaviors for the α-$Al_2O_3$ doped YSZ powders using either DI water with a pH value of 3 (acidified with nitric acid) or ethanol for mixing although the $(dL/dT)_{max}$ in FIG. 6 is slightly higher than that in FIG. 5 for each composition. However, neither DI water with a pH value of 3 (acidified with nitric acid) nor ethanol is acceptable for SOFC tape casting technology if water-based tape casting technology is used and the binders system will not work in the acid environment (at the pH value of 3) so that in a preferred mixing technique only DI water with 3 wt % Darvan® C as the dispersant was used to mix the ultrafine-α-$Al_2O_3$ powder and YSZ powder and an ultrasonic probe with a power of 60 watts was used to disperse the ultrafine α-$Al_2O_3$ powder in the DI water for 3 minutes, then the dopant was ball milled first for 4 hrs before adding YSZ powder. Binders for improving die-pressing were also added one hour before the end of ball milling. The total ball milling time was 24 hrs. SEM result showed that ultrafine α-$Al_2O_3$ particles were dispersed more homogeneously and hardly agglomerated in the YSZ matrix. The preferred mixing method described above also improved the relative density of 2 mol % α-$Al_2O_3$ doped YSZ by about 2% when pressurelessly sintered at 1380° C. for 1 hr, that is, the doped YSZ reached 97.5% relative density compared to 95.5% when mixed using DI water at a pH value of 3 (acidified with nitric acid) and sintered together at 1380° C. for 1 hr. Based on the results of the above trials, the powder mixtures with compositions as shown in Table 1 were prepared using the preferred mixing method and submitted to additional processing. Three bar samples of 4 mm×4 mm×25 mm for each composition were pressurelessly sintered at 1380° C. for 1 hr for density measurement by the Archimedes method.

Figure 7:
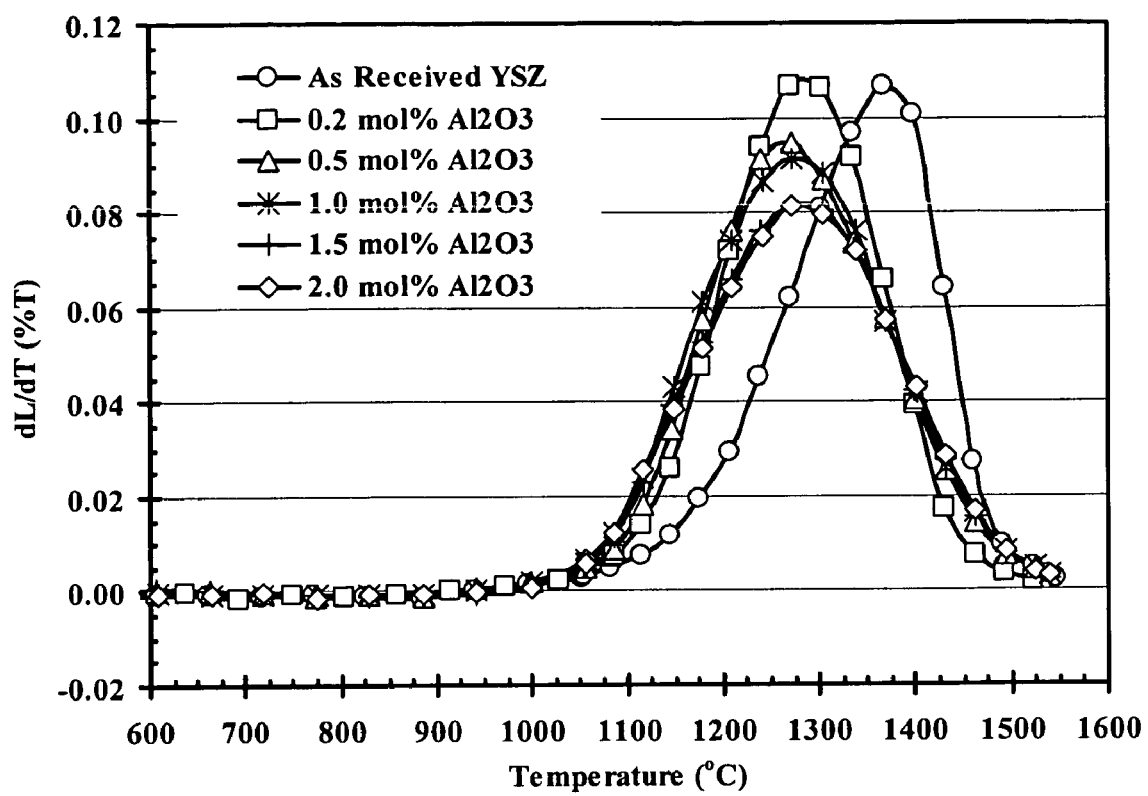
FIG. 7 is a graph of the shrinkage rate of YSZ doped with ultrafine-α-$Al_2O_3$ as measured by dilatometry using water for mixing with binders.
Figure 8:
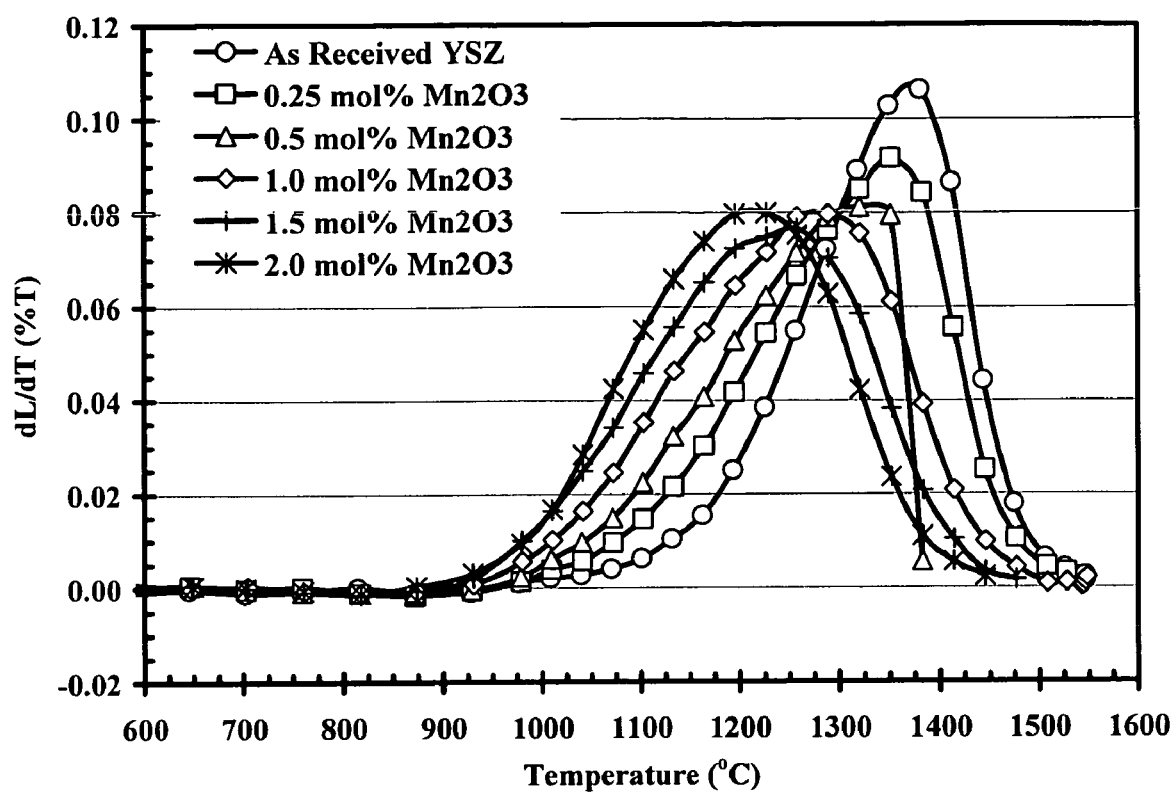
FIG. 8 is a graph of the shrinkage rate of YSZ doped with $Mn_2O_3$ as measured by dilatometry using water for mixing with binders.
Figure 9A:
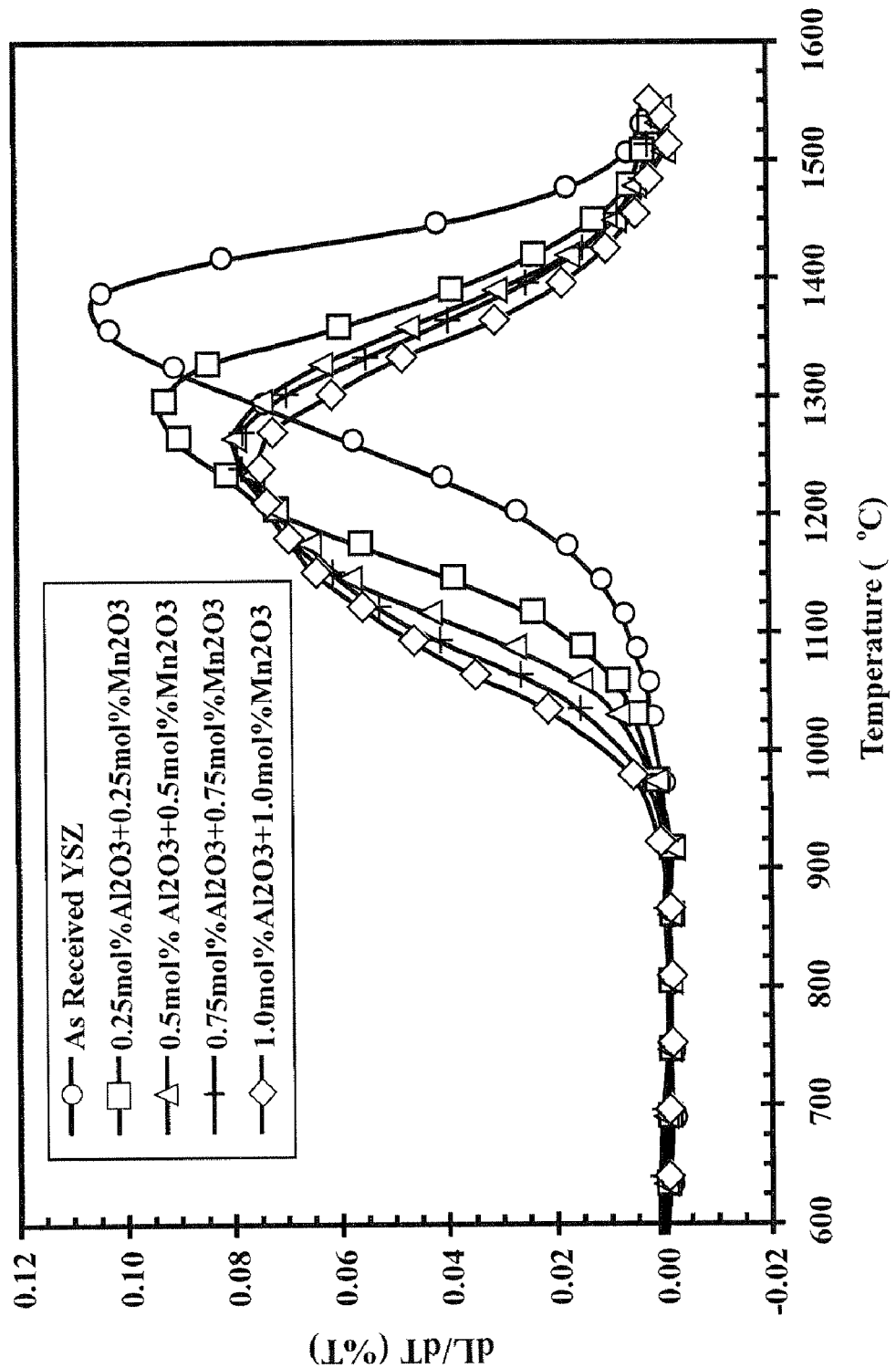
FIGS. 9A-B are graphs of the shrinkage rate of YSZ doped with ultrafine-α-$Al_2O_3$ and $Mn_2O_3$ as measured by dilatometry using water for mixing with binders. (A) 50%/50% of α-$Al_2O_3$/$Mn_2O_3$ and (B) at fixed 0.5 mol % α-$Al_2O_3$ and various $Mn_2O_3$ amounts.
Figure 9B:
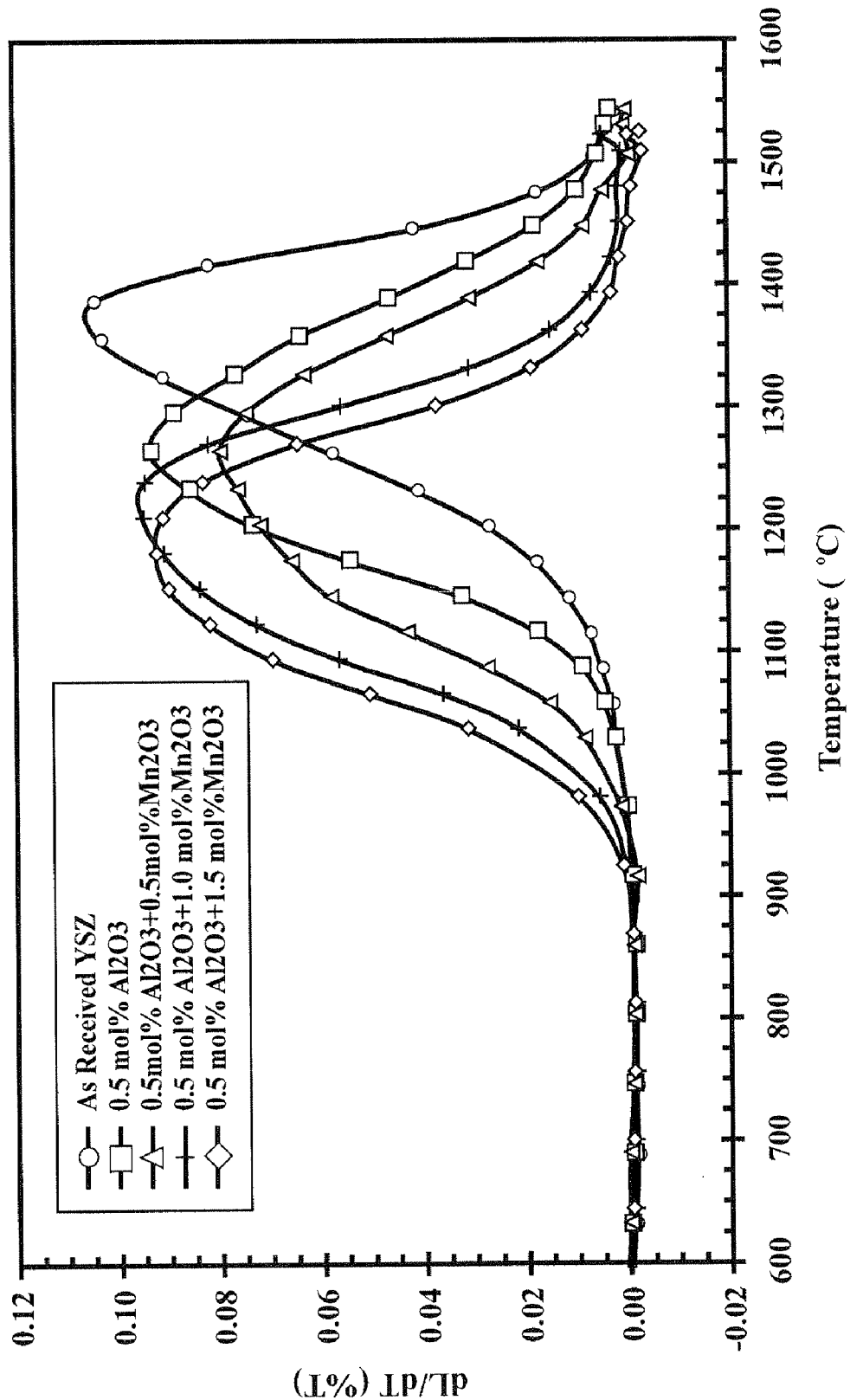

Sintering Behaviors of Undoped YSZ and Doped YSZ in Dilatometry and Densities by Free Sintering The sintering behaviors of three doped YSZ series were studied by dilatometry and free sintering. FIGS. 7 to 9 show the first derivative of the shrinkage curves as measured by dilatometry for ultrafine-α-$Al_2O_3$, $Mn_2O_3$, and $Al_2O_3$+$Mn_2O_3$ doped YSZ powder mixtures, respectively (their compositions are listed in Table 1). Some important parameters from the dL/dT curves are defined and summarized in Table 2. All the powder mixtures were prepared using the same procedure described below, which is favorable to the water-based SOFC tape casting technology, because the binders used in the water-based SOFC tape casting technology will not be dissolved in ethanol and will be decomposed in the acid environment (at the pH value of 3), and favorable to ensure that dopants are distributed homogeneously in the YSZ matrix as shown above. DI water with 3 wt % Darvan® C as the dispersant was used to mix the dopant powders and YSZ powder and an ultrasonic probe with a power of 60 watts was used to disperse the dopant powders in the DI water for 3 minutes, then the dopants were ball milled first for 4 hrs before adding YSZ powder. Binders for improving die-pressing were also added one hour before the end of ball milling. The total ball milling time was 24 hrs.

As shown in FIGS. 7 to 9 as well as in Table 2, over all, the $(dL/dT)_{max}$ and the peak temperature $(T_{peak})$ of the (dL/dT) curve were reduced with dopants. The $(dL/dT)_{max}$ was reduced from 0.1075 for pure YSZ, to 0.0825 with 2.0 mol % $Al_2O_3$, to 0.0811 with 2.0 mol % $Mn_2O_3$, and to 0.0757 with 2.0 mol % $Al_2O_3$+$Mn_2O_3$. The peak temperature $(T_{peak})$ was reduced from 1377° C. for pure YSZ to 1268° C. with 0.5 mol % $Al_2O_3$, to 1205° C. with 2.0 mol % $Mn_2O_3$, to 1226° C. with 1.0 mol % $Al_2O_3$+1.0 mol % $Mn_2O_3$, and to 1170° C. with 0.5 mol % $Al_2O_3$+1.5 mol % $Mn_2O_3$. The $T_{peak}$ of $Al_2O_3$ doped YSZ recovered slightly with higher dopant levels, to 1288° C. with 2.0 mol % $Al_2O_3$. All the (dL/dT) curves became broader with dopants. The full width half maximum (FWHM) could be increased from 181° C. for pure YSZ to 281° C. with 2.0 mol % $Al_2O_3$+$Mn_2O_3$. The asymmetry, y, of the (dL/dT) curves, in most cases, was reduced with dopants, except for 0.25 and especially for 0.5 mol % $Mn_2O_3$ doping, as shown in FIG. 8. It can be concluded that $Al_2O_3$+$Mn_2O_3$ co-doping has more significant effects on the sintering behaviors of YSZ than separate $Al_2O_3$ doping and $Mn_2O_3$ doping, that is, $Al_2O_3$+$Mn_2O_3$ co-doping improves YSZ densification more than only $Al_2O_3$ doping or only $Mn_2O_3$ doping.

TABLE 2

Summary of dilatometry results for $Al_2O_3$, $Mn_2O_3$, and $Al_2O_3$ + $Mn_2O_3$ doped YSZ

| Dopant(mol %) | (dL/dT)max | Tpeak | $T_1$ | $T_2$ | FWHM | γ |
|---|---|---|---|---|---|---|
| Al2O3 doped YSZ | | | | | | |
| 0 | 0.1075 | 1377 | 1255 | 1436 | 181 | 2.0678 |
| 0.2 | 0.1077 | 1285 | 1186 | 1380 | 194 | 1.0421 |
| 0.5 | 0.0951 | 1268 | 1165 | 1387 | 222 | 0.8655 |
| 1 | 0.0917 | 1273 | 1153 | 1392 | 239 | 1.0084 |
| 1.5 | 0.0826 | 1288 | 1150 | 1402 | 252 | 1.2105 |
| 2 | 0.0825 | 1288 | 1152 | 1403 | 251 | 1.1826 |
| Mn2O3 doped YSZ | | | | | | |
| 0 | 0.1075 | 1377 | 1255 | 1436 | 181 | 2.0678 |
| 0.25 | 0.092 | 1357 | 1206 | 1423 | 217 | 2.2879 |
| 0.5 | 0.0853 | 1326 | 1168 | 1374 | 206 | 3.2917 |
| 1 | 0.0802 | 1282 | 1120 | 1382 | 262 | 1.6200 |
| 1.5 | 0.0775 | 1255 | 1084 | 1351 | 267 | 1.7813 |
| 2 | 0.0811 | 1205 | 1067 | 1325 | 258 | 1.1500 |
| Al + Mn doped YSZ with 50/50 mol % of Al2O3/Mn2O3 | | | | | | |
| 0 | 0.1075 | 1377 | 1255 | 1436 | 181 | 2.0678 |
| 0.5 | 0.0935 | 1301 | 1158 | 1378 | 220 | 1.8571 |
| 1 | 0.0814 | 1251 | 1112 | 1371 | 259 | 1.1583 |
| 1.5 | 0.0805 | 1255 | 1089 | 1361 | 272 | 1.5660 |
| 2 | 0.0757 | 1226 | 1068 | 1349 | 281 | 1.2846 |
| Al + Mn doped YSZ with fixed 0.5 mol % Al2O3 | | | | | | |
| 0 | 0.1075 | 1377 | 1255 | 1436 | 181 | 2.0678 |
| 0.5Al + 0Mn | 0.0951 | 1268 | 1165 | 1387 | 222 | 0.8655 |
| 0.6Al + 0.5Mn | 0.0814 | 1251 | 1112 | 1371 | 259 | 1.1583 |
| 0.5Al + 1.0Mn | 0.0973 | 1228 | 1082 | 1308 | 226 | 1.8250 |
| 0.5Al + 1.5Mn | 0.0942 | 1170 | 1060 | 1289 | 229 | 0.9244 |

FWHM = Full-Width Half-Maximum
Asymmetry:
γ = (Tmax-Tlow)/(Thigh-Tmax) = (Tmax-T1)/(T2-Tmax)

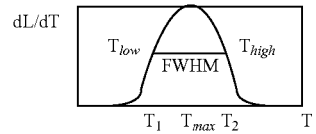

Figure 10:
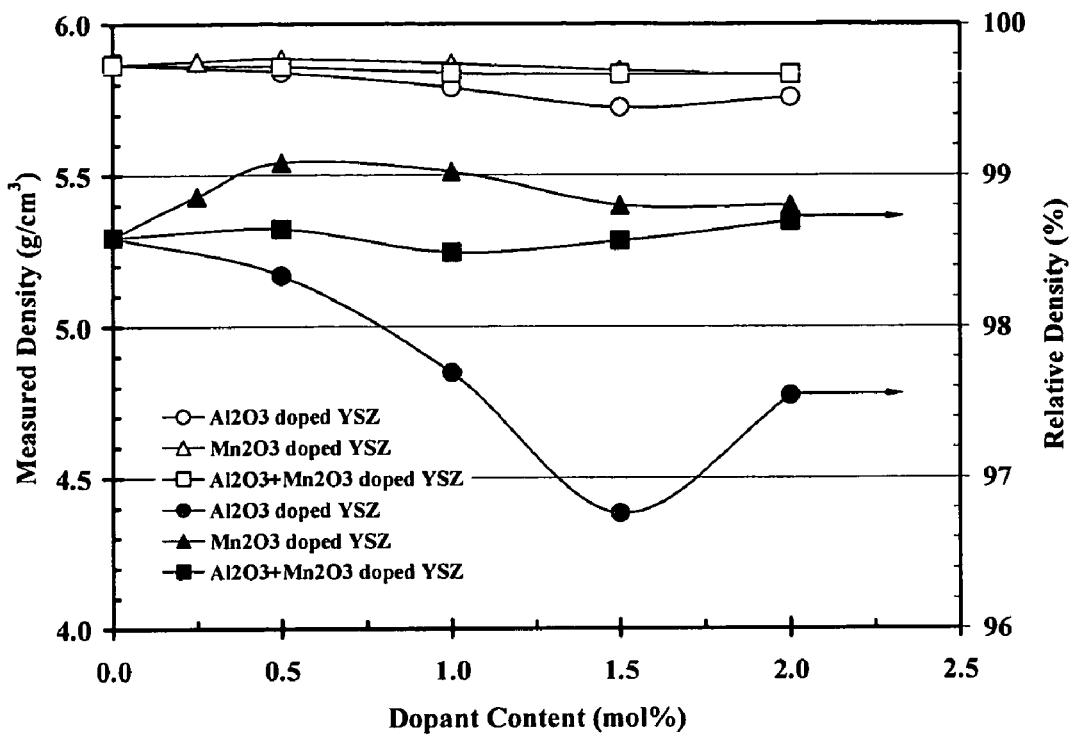
FIG. 10 is a graph of the measured densities of undoped YSZ and doped YSZ after pressurelessly sintering at 1380° C. for 1 hr.

The measured densities and relative densities of $Al_2O_3$ doped YSZ, $Mn_2O_3$ doped YSZ, and $Al_2O_3$+$Mn_2O_3$ (equimolar) co-doped YSZ bar samples (all three series) after die-pressing and then pressurelessly sintering at 1380° C. for 1 hr are shown in FIG. 10. The densities were measured by the Archimedes method. The theoretical densities of the doped YSZs used to calculate the relative densities were calculated by using the mixture rule of composites and the theoretical densities of YSZ, $Al_2O_3$ and $Mn_2O_3$, assuming no solubility or reaction between these components. As shown in FIG. 10, none of doping with $Al_2O_3$, $Mn_2O_3$, and $Al_2O_3$+$Mn_2O_3$ had a significant effect on improving the densification of Tosoh TZ-8Y at this temperature probably because YSZ powder, such as, for example, Tosoh TZ-8Y, usually has good sinterability at such a high temperature when pressurelessly sintering. The sintering temperature of about 1380° C. was selected because it was the preferred temperature for hot pressing SOFCs. However, the chosen sintering temperature was substantially higher than the $T_{peak}$ of doped YSZ, as shown in Table 2, so that all the doped YSZs could be oversintered at 1380° C., which would reduce the densities. Another reason that $Al_2O_3$ doped YSZ had a slightly lower density could be that the best mixing technique for dispersing ultrafine $Al_2O_3$ in YSZ developed here was still not perfect. Usually, agglomeration will cause low densification.

Sintering Behaviors of Undoped YSZ and Doped YSZ in Hot Pressing

Figure 11:
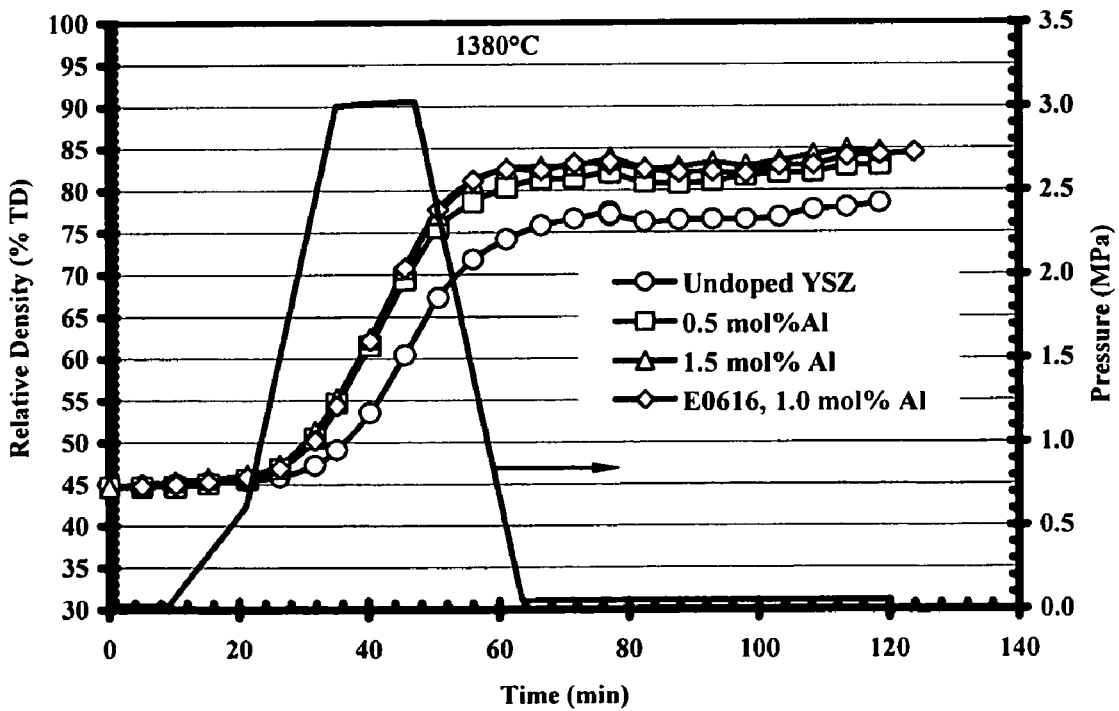
FIG. 11 is a graph of the relative density of ultrafine-α-$Al_2O_3$ doped YSZ measured during hot pressing T1P2 cycle.
Figure 12:
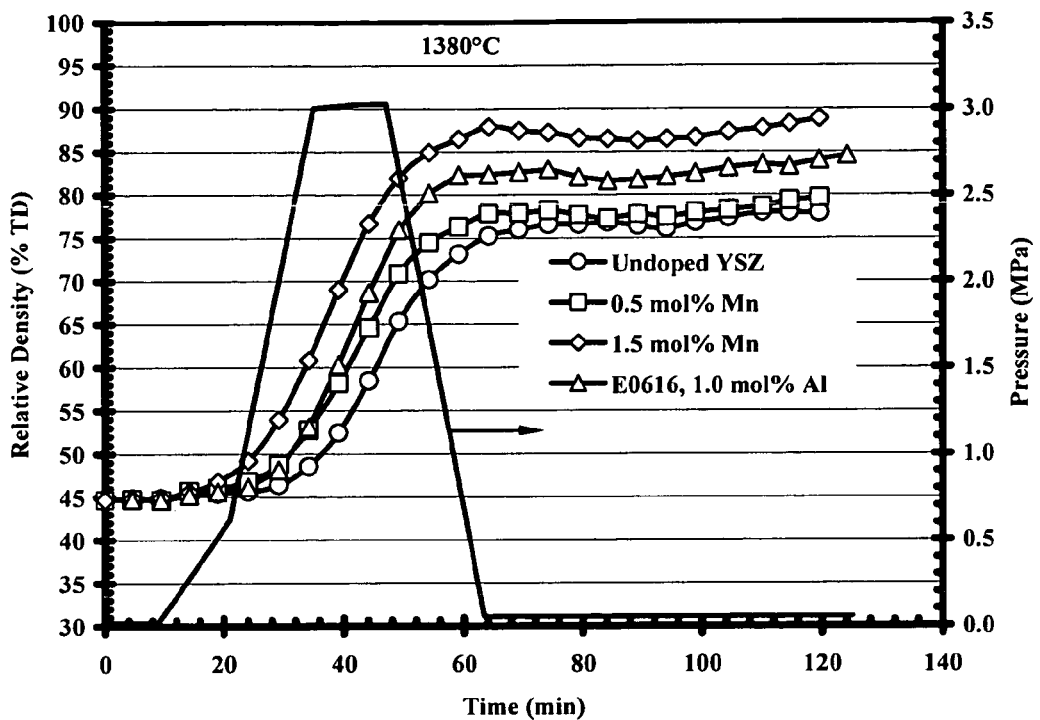
FIG. 12 is a graph of the relative density of $Mn_2O_3$ doped YSZ measured during hot pressing T1P2 cycle.
Figure 13:
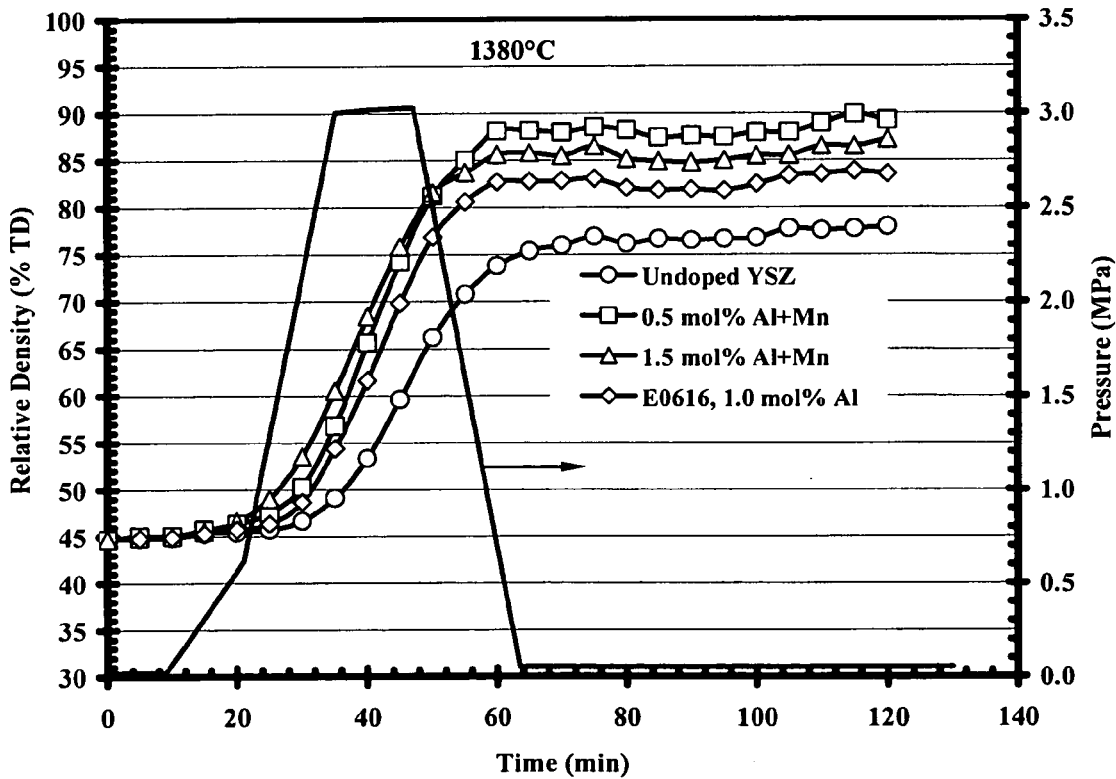
FIG. 13 is a graph of the relative density of α-$Al_2O_3$+$Mn_2O_3$ (equi-molar) co-doped YSZ measured during hot pressing T1P2 cycle.

The sintering behaviors of selected materials were studied by hot pressing. Preliminary results are shown in FIGS. 11 to 13. The materials selected for this study are Samples #0, #1, #3, #6, #8, #10 and #12. Their compositions are listed in Table 1. The data from a reference electrolyte E0616 (1.0 mol % $Al_2O_3$ ($d_{50}$=0.3 µm) doped YSZ) are also plotted in these figures for comparison. FIGS. 11 to 13 are the relative densities of the selected materials calculated from the dimension change during hot pressing measured by a laser and their green densities. The densities of hot pressed samples were measured by image analysis using SEM. Disk samples with a diameter of 28.75 mm and a thickness of about 2 mm in the green form followed the same temperature and pressure profiles first and then were used for hot pressing (T1, temperature up to 1380° C., P2, pressure). FIG. 11 shows that ultrafine ($d_{50}$ particle size of 10-200 nm) α-$Al_2O_3$ doped YSZ has a similar relative density with the micro ($d_{50}$ particle size of 0.5-5 µm) α-$Al_2O_3$ doped YSZ if calibrated with the green density difference. It is possible that the current hot pressing procedure did not reveal the advantage of ultrafine particles and/or the ultrafine particles were not well dispersed homogeneously in the YSZ matrix. However, as shown in FIGS. 12 and 13, Samples #8 (1.5 mol % $Mn_2O_3$ doped YSZ), #10 (0.25 mol % α-$Al_2O_3$+0.25 mol % $Mn_2O_3$ co-doped YSZ) and #12 (0.75 mol % α-$Al_2O_3$+0.75 mol % $Mn_2O_3$ co-doped YSZ) showed improved relative density (up to 5% improvement after calibrated with the green density difference) with the same hot pressing procedure, as compared to E0616. Therefore, Samples #8, #10, #12 were selected as new electrolyte candidates and further studies on their sintering behaviors were conducted by hot pressing.

Figure 14:
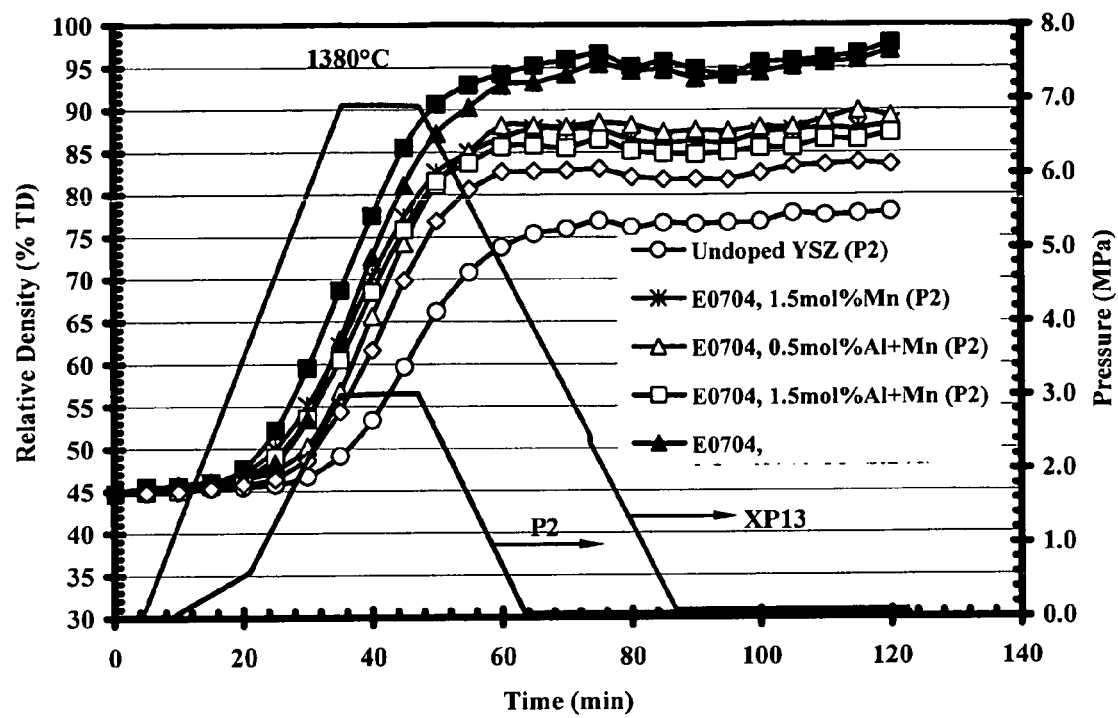
FIG. 14 is a graph of the relative density of doped YSZ (with equi-molar α-$Al_2O_3$+$Mn_2O_3$) measured during hot pressing under T1 (1380° C.), P2 (low pressure) and T1 (1380° C.), XP13 (high pressure).
Figure 15:
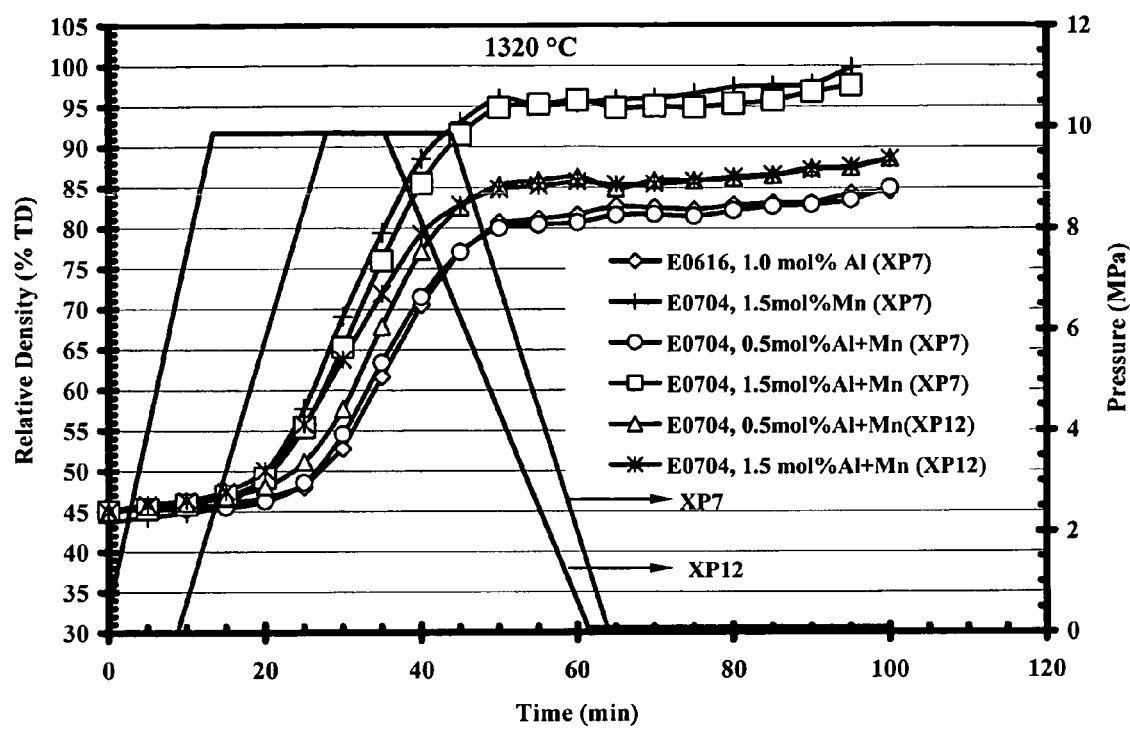
FIG. 15 is a graph of the relative density of doped YSZ (with equi-molar α-$Al_2O_3$+$Mn_2O_3$) measured during hot pressing XT5 (1320° C.), XP7 and XT5 (1320° C.), XP12.
Figure 16A:
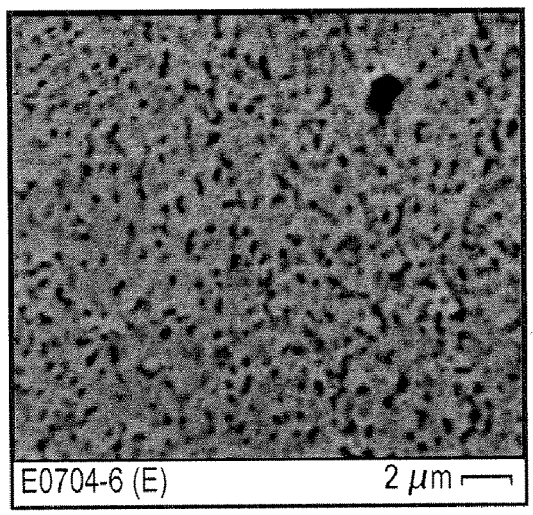
FIGS. 16A-E are SEM photographs of undoped and doped YSZs (with equi-molar α-$Al_2O_3$+$Mn_2O_3$) after T1, P2 profiles hot pressing: (A) undoped YSZ, (B) E0616, (C) 1.5 mol % $Mn_2O_3$ doped YSZ, (D) 0.25 mol % α-$Al_2O_3$+0.25 mol % $Mn_2O_3$ doped YSZ, and (E) 0.75 mol % α-$Al_2O_3$+0.75 mol % $Mn_2O_3$ doped YSZ.
Figure 16B:
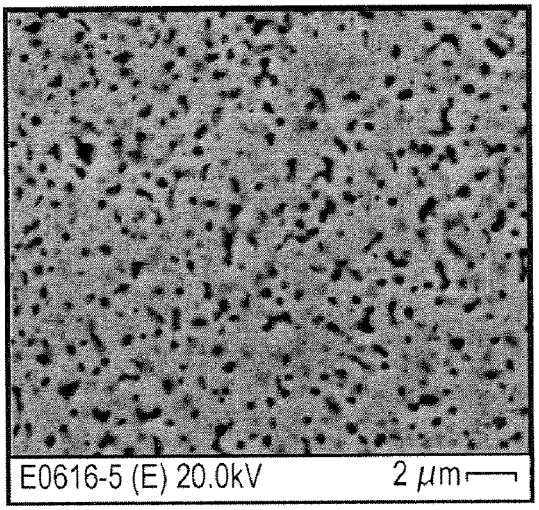
Figure 16C:
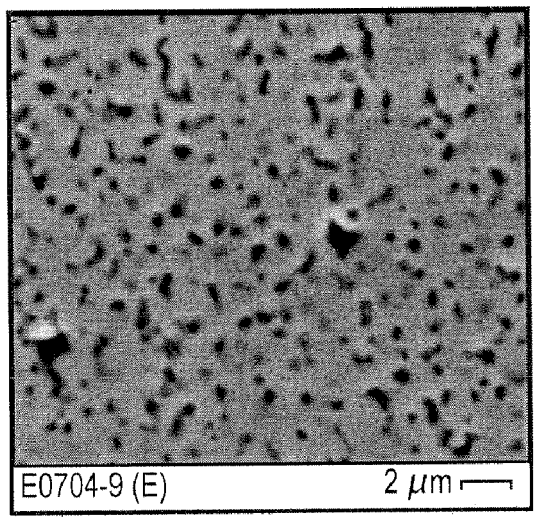
Figure 16D:
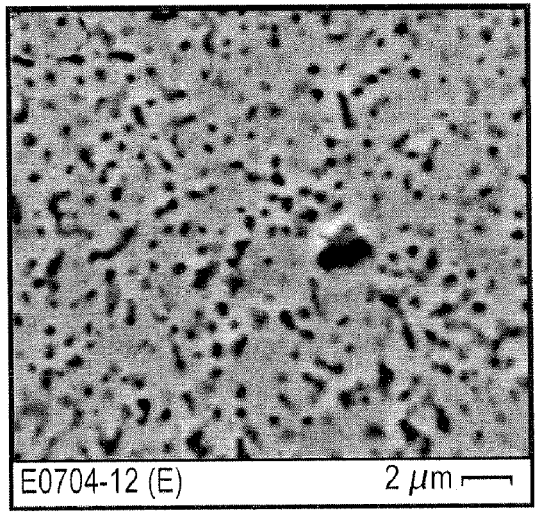
Figure 16E:
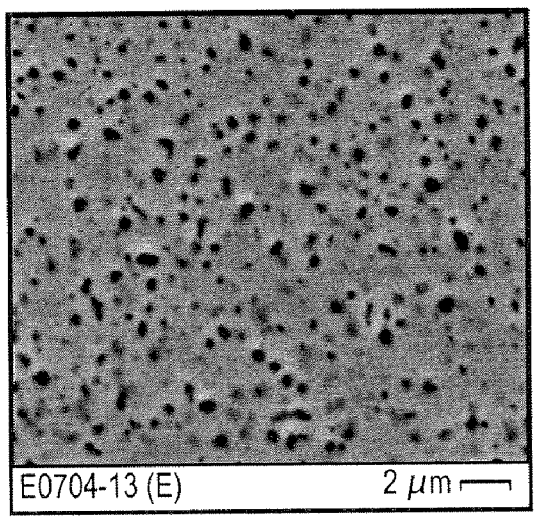
Figure 17A:
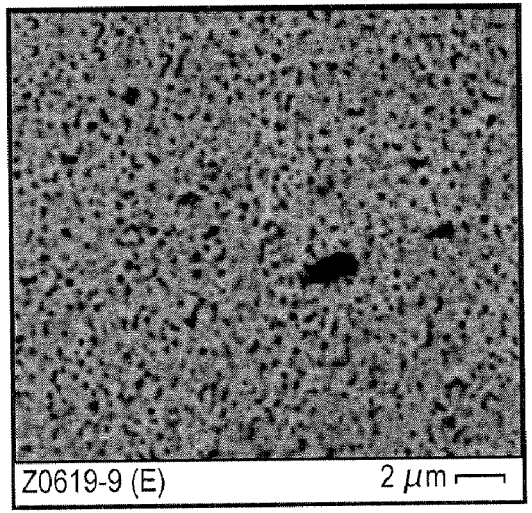
FIGS. 17A-D are SEM photographs of doped YSZs (with equi-molar α-$Al_2O_3$+$Mn_2O_3$) after XT5, XP7 profiles hot pressing: (A) E0616, (B) 0.25 mol % $Al_2O_3$+0.25 mol % $Mn_2O_3$ doped YSZ, (C) 0.75 mol % $Al_2O_3$+0.75 mol % $Mn_2O_3$ doped YSZ, and (D) 1.5 mol % $Mn_2O_3$ doped YSZ.
Figure 17B:
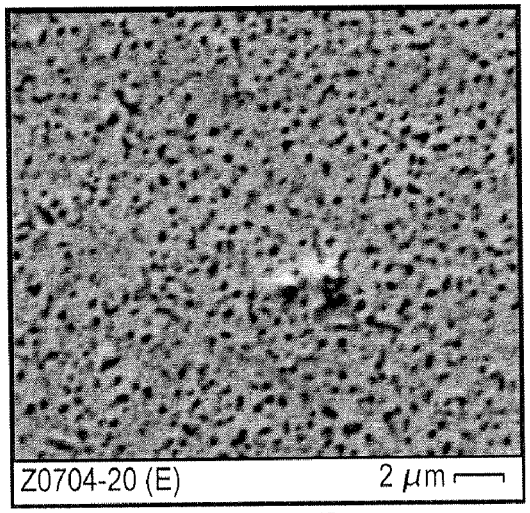
Figure 17C:
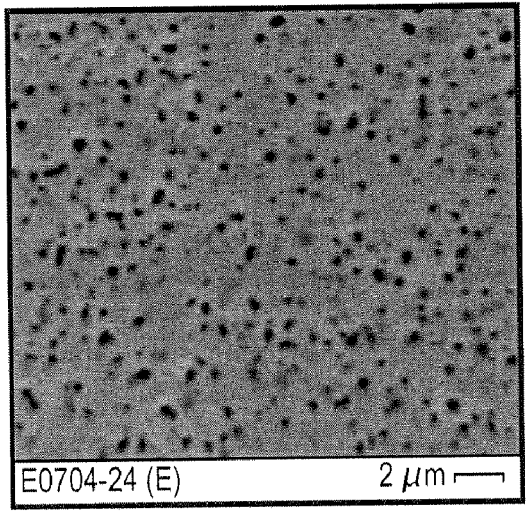
Figure 17D:
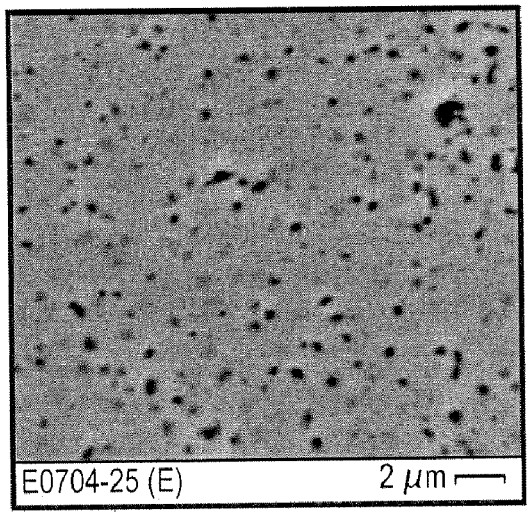

Various hot pressing procedures were selected to study the densification behaviors of selected compositions from the three doped YSZ series. The study was conducted on some electrolyte candidates of Samples #8 (1.5 mol % $Mn_2O_3$ doped YSZ), #10 (0.25 mol % α-$Al_2O_3$+0.25 mol % $Mn_2O_3$ co-doped YSZ), #12 (0.75 mol % α-$Al_2O_3$+0.75 mol % $Mn_2O_3$ co-doped YSZ), and E0616 under T1 (1380° C.), P2 (3 MPa); XT5 (1320° C.), XP7 (10 MPa, loading started at 1000° C.); T1, XP13 (7 MPa); and XT5, XP12 (10 MPa; loading started at 900° C.). FIGS. 14 and 15 show the relative density and beta, respectively, as measured during hot pressing for the above four materials, including undoped YSZ as comparison. Under T1, P2 cycles, all doped YSZs show much higher relative densities than undoped YSZ (only 77%) (FIG. 14) and Samples #8, #10, and #12 are higher than E0616. Sample #10 shows the highest relative density (89%). Sample #8 and #12 also show high relative densities. Under XT5, XP7 cycles (lower temperature but higher pressure) as shown in FIG. 15, both Sample #8 and #12 have relative densities over 95% because of their low $T_{peak}$ (~1200° C.) of the (dL/dT) curve but both Sample #10 and E0616 have relative densities only ~83% because of their high $T_{peak}$ (~1300° C.). The results of Samples #10 and #12 under new hot pressing profiles, XP12 and XP13 with XT5 and T1, are also shown in FIGS. 14 and 15. Both Sample #10 and #12 had higher relative densities (~95%) under T1 and XP13 (higher pressure), compared to T1 and P2 (lower pressure), because of the use of a much higher pressure. The relative density was improved for Sample #10 (~5% relative density gain) when loading starting at 900° C. instead of at 1000° C., as shown in FIG. 15. However, the density of Sample #12 was decreased under XT5 and XP12 because the load might have been released too soon and because of its low $(dL/dT)_{max}$ (0.0805, so that more time was needed to densify) compared to Sample #10 with a higher $(dL/dT)_{max}$ (0.0935). The low $T_{peak}$ and low $(dL/dT)_{max}$ for Sample #12 meant that Sample #12 densification started earlier but needed more time. Sample #10 showed the opposite densification behavior so that it is very possible for both samples to reach the same relative density under XT5 and XP12 cycles.

The densities (porosities) of hot pressed samples were measured using SEM and image analysis (IA) techniques. These samples included some electrolyte candidates of Samples #8 (1.5 mol % $Mn_2O_3$ doped YSZ), #10 (0.25 mol % α-$Al_2O_3$+0.25 mol % $Mn_2O_3$ doped YSZ), #12 (0.75 mol % α-$Al_2O_3$+0.75 mol % $Mn_2O_3$ doped YSZ), and E0616 under T1 (1380° C.), P2 and XT5 (1320° C.), XP7 (loading started at 1000° C.). FIGS. 16 and 17 are the SEM photographs, respectively, and Table 3 summarizes the relative density and beta as measured during hot pressing, as well as the porosity measured by the IA technique for the above four materials, including undoped YSZ as comparison. The relative densities of the selected materials were calculated from the dimension change during hot pressing (diameter change measured by a laser and height change measured by an Instron machine) and their green densities. The porosities were measured from 6 images for each sample using the IA technique. As shown in FIGS. 16, 17 and Table 3, under T1, P2 cycles, all doped YSZs showed much higher relative densities than undoped YSZ (only 77%) and Samples #8, #10, and #12 were higher than E0616. Sample #10 showed the highest relative density (89%). Sample #8 and #12 also showed high relative densities. Under XT5, XP7 cycles (lower temperature but higher pressure) as shown in FIG. 17 and Table 3, both Sample #8 and #12 had relative densities over 95% because of their low $T_{peak}$ (~1200° C.) of the (dL/dT) curve but both Sample #10 and E0616 had relative densities of only about 83% because of their high $T_{peak}$ (~1300° C.). The porosity measured by the IA technique and the relative density measured by the laser matched each other very well (the total was about 100%) for all the samples in this study. In T1, P2 profiles, 0.25 mol % α-$Al_2O_3$+0.25 mol % $Mn_2O_3$ doped YSZ performed better than E0616; in XT5, XP7 profiles, both 1.5 mol % $Mn_2O_3$ and 0.75 mol % α-$Al_2O_3$+0.75 mol % $Mn_2O_3$ doped YSZ performed better than E0616.

Figure 18A:
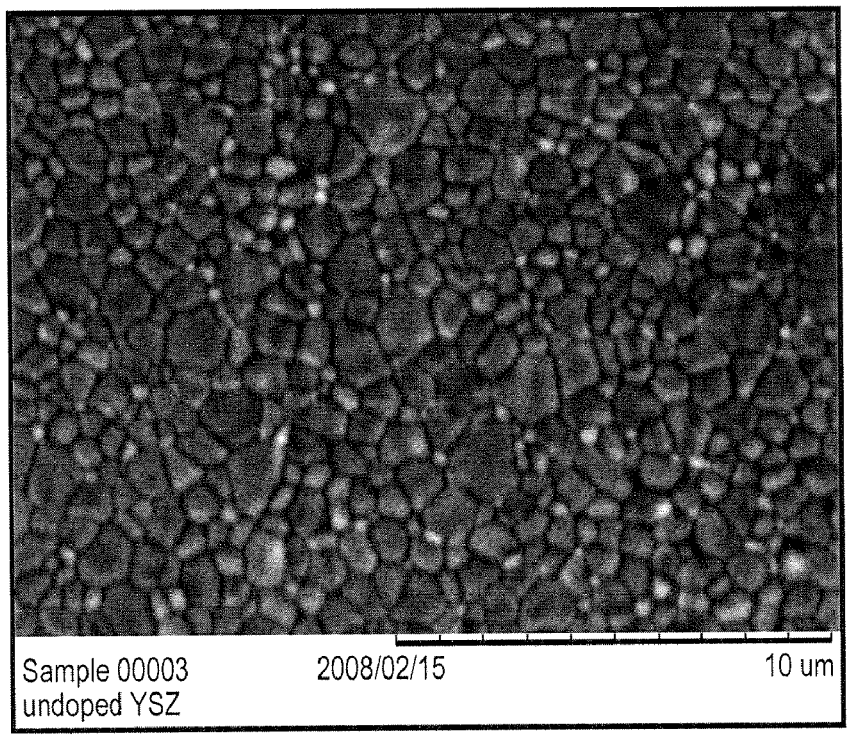
FIGS. 18A-D are SEM photographs of undoped and doped YSZ samples after pressurelessly sintered at 1380° C. for 1 hr: (A) Undoped YSZ, (B) 0.5 mol % α-$Al_2O_3$ doped YSZ, (C) 2.0 mol % α-$Al_2O_3$ doped YSZ and (D) 2.0 mol % $Mn_2O_3$ doped YSZ.
Figure 18B:
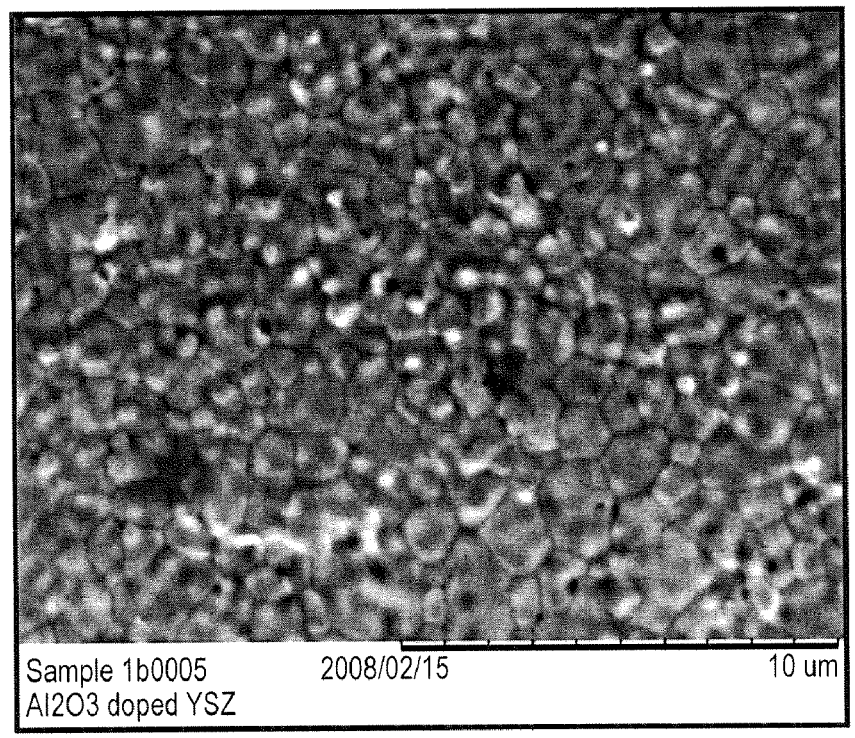
Figure 18:
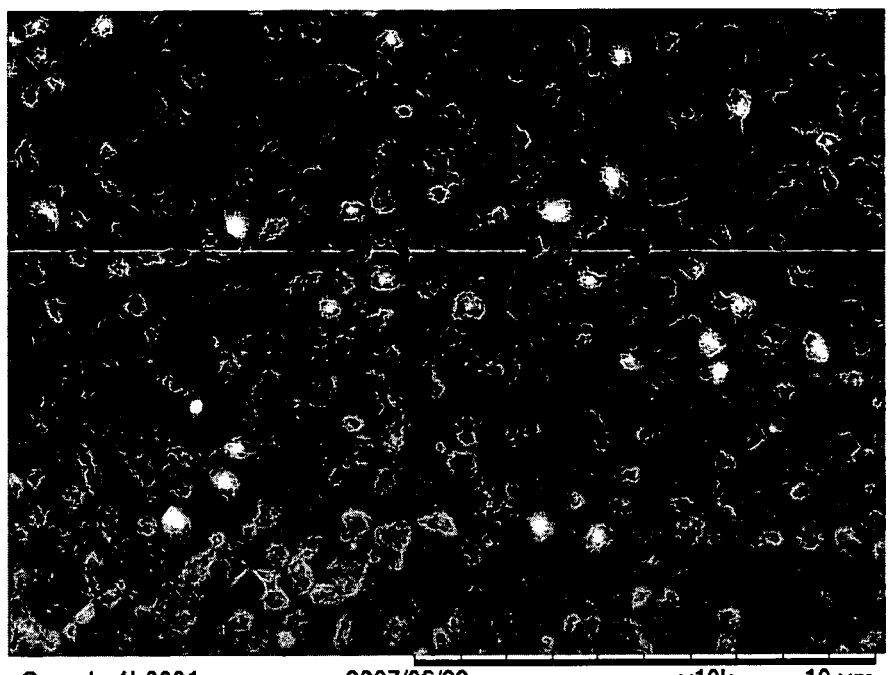
Figure 18:
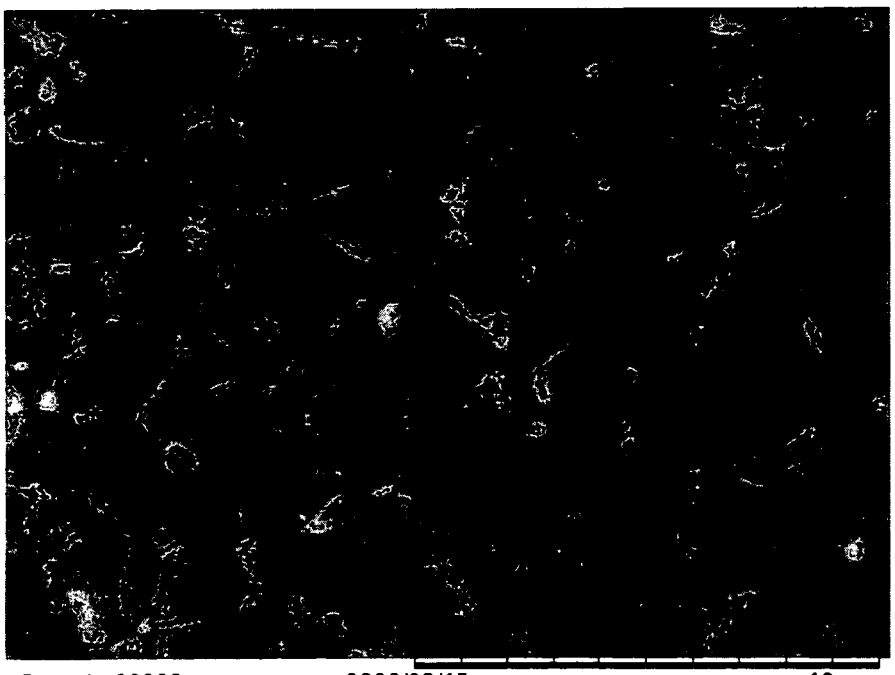

The roles of aluminum and manganese oxides on sintering and conductivity of yttria-stabilized zirconia as SOFC electrolyte have been extensively studied in the prior art, but, to our knowledge, none has used α-$Al_2O_3$+$Mn_2O_3$ to co-dope YSZ. Only Sakka et al., added $Al_2O_3$+$Mn_3O_4$ to 3 mol % $Y_2O_3$ doped $ZrO_2$ (3YZP) to fabricate high-strain rate superplastic 3YTZ. Y. Sakka, T. Ishii, T. S. Suzuki, K. Morita, K. Hiraga, *Fabrication of high-strain rate superplastic yttria-doped zirconia polycrystals by adding manganese and aluminum oxides*, J. Euro. Ceram. Soc., 24 (2004) 449-453. The solubility of $Al_2O_3$ in $ZrO_2$ grain is very low, only 0.5 mol %. $Al_2O_3$ can be dissolved in $Y_2O_3$ stabilized $ZrO_2$ at 1700° C. and cooled at 220° C./hr. M. Miyayama, H. Yanagida, and A. Asada, *Effects of $Al_2O_3$ additions on resistivity and microstructure of yttria-stabilized zirconia*, Am. Ceram. Soc. Bull., 65[4] (1986) 660-664. The solubility of $Al_2O_3$ is about 0.1 mol % when sintered at 1300° C., so that the $Al_2O_3$ additions in this study are far beyond the $Al_2O_3$ solubility. H. Bernard, *Sintered Stabilized Zirconia Microstructure and Conductivity*, Report CEA-R-5090, Commissariat a l'Energie Atomique, CEN-Saclay, France, 1981, P117. Guo et al., have found that there are three forms of $Al_2O_3$ in existence in $ZrO_2$. X. Guo and R. Z. Yuan, *Roles of alumina in zirconia-based solid electrolyte*, J. Mater. Sci., 30 (1995) 923-931; X. Guo, C. Q. Tang, and R. Z. Yuan, *Grain boundary ionic conduction in zirconia-based solid electrolyte with alumina addition*, J. Euro. Ceram. Soc., 15 (1995) 25-32. They are: (1) a very small amount of $Al_2O_3$ is dissolved in $ZrO_2$ grains; (2) the surplus $Al_2O_3$ then forms $Al_2O_3$ particles, which are extensively situated intra- and intergranularly; (3) $Al_2O_3$ segregates at grain boundaries, and forms the crystal and the amorphous Al-rich grain boundary phases. The amorphous phase contains impurities such as Si and Ca. However, manganese is soluble in YSZ, with a solubility limit between 5 mol % at 1000° C. and 15 mol % at 1500° C. Mn stabilizes the cubic zirconia phase and therefore delays the cubic-to-tetragonal phase transformation. This was confirmed by SEM examination, as shown in FIG. 18. FIG. 18 shows the $\alpha$-$Al_2O_3$ particles on the surfaces of 0.5 mol % $\alpha$-$Al_2O_3$ and 2.0 mol % $\alpha$-$Al_2O_3$ doped YSZ samples (FIGS. 18($b$) and 18($c$)) but none of $Mn_2O_3$ particles on the surface of 2.0 mol % $Mn_2O_3$ doped YSZ samples (FIG. 18($d$)) after sintering pressurelessly at 1380° C. for 1 hr. FIG. 18 also shows that $ZrO_2$ particles sizes in doped YSZ samples are much larger than in the undoped YSZ sample (especially comparing FIG. 18($d$) showing 2.0 mol % $Mn_2O_3$ doped YSZ with FIG. 18($a$) showing undoped YSZ).

In the $ZrO_2$ system, the control step of densification is the bulk diffusion of $Zr^{4+}$ which is affected by the defect structure of $ZrO_2$. The defect structure of $ZrO_2$ is essentially controlled by the dopant when the dopant, such as $Mn_2O_3$, is dissolved in $ZrO_2$ in large amounts. The cation (e.g., $Zr^{4+}$) diffusion in the zirconia systems is much smaller than the oxygen diffusion so that the grain growth is controlled by the cation diffusion. It has been found that the grain growth rate increased by adding $Al_2O_3$ and $Mn_2O_3$ in YSZ as shown in FIG. 18 and adding $Al_2O_3$ and $Mn_3O_4$ in 3YTZP. X. Guo and R. Z. Yuan, *Roles of alumina in zirconia-based solid electrolyte*, J. Mater. Sci., 30 (1995) 923-931; Y. Sakka, T. Ishii, T. S. Suzuki, K. Morita, K. Hiraga, *Fabrication of high-strain rate superplastic yttria-doped zirconia polycrystals by adding manganese and aluminum oxides*, J. Euro. Ceram. Soc., 24 (2004) 449-453. Therefore, it is concluded that cation diffusion is enhanced by adding $Al_2O_3$ and/or $Mn_2O_3$ ($Mn_3O_4$) to zirconia. In fact, the $Al_2O_3$ addition has a dual effect on grain growth. First, the intergranular $Al_2O_3$ particles pin grain boundaries; second, the $Al_2O_3$ segregated at grain boundaries can improve the mobility of the boundaries because the $Al_2O_3$ segregation at grain boundaries may increase the grain-boundary diffusion coefficient. The above experimental results demonstrate that the sum of these two effects of $Al_2O_3$ is to promote grain growth. Therefore, adding $Al_2O_3$ and $Mn_2O_3$ enhance the densification of YSZ. The decrease in sintering temperature with $Al_2O_3$ doping may be also ascribed to a liquid-phase sintering mechanism. $Al_2O_3$ and the impurities (such as $SiO_2$) in TZ-8Y can form a low temperature liquid phase during sintering which improve the sinterability of YSZ. M. J. Verkerk, A. J. A. Winnubst, and BA. J. Burggraaf, *Effect of impurities on sintering and conductivity of yttria-stabilized zirconia*, J. Mater. Sci., 17 (1982) 3113-3122.

In this study, the densities of hot pressed samples were lower than the densities of free sintered samples at the same temperature because of the constraint from the hot pressing fixture (dense zirconia plates on both surfaces of the samples here) which would reduce the shrinkage and densification of both undoped and doped YSZs if the hot pressing load (such as the load used) was not high enough to overcome this reduction in shrinkage.

Conductivity of Undoped YSZ and doped YSZ

The electronic conductivities of Sample #0 (pure YSZ), #4, #9, and #13 (with the highest dopant level, 2.0 mol % in each YSZ series in this study) were measured in both air and forming gas at 800, 900, and 1000° C. by the two-probe technique. The results are summarized in Table 4. Table 4 also shows the total conductivity of these samples. It has been found that doping with $Al_2O_3$, $Mn_2O_3$, and $Al_2O_3$+$Mn_2O_3$ does not increase the electronic conductivity of YSZ (in fact, the electronic conductivity decreases with Mn doping confirming earlier statements in the literature). The electronic conductivities of doped YSZ are lower than pure YSZ in both air and forming gas. Therefore, the OCV of cells using the doped YSZ as the electrolytes will be as good as using undoped YSZ as the electrolyte. Verkerk et al., have found that 0.78 mol % $Al_2O_3$ addition has a negative influence on both the bulk and grain-boundary conductivity of YSZ, and Mn doping was always found to reduce the bulk conductivity of YSZ but responsible for slow conductivity decay (>1000 hrs) at high temperature (850-1000° C.). M. J. Verkerk, A. J. A. Winnubst, and BA. J. Burggraaf, *Effect of impurities on sintering and conductivity of yttria-stabilized zirconia*, J. Mater. Sci., 17 (1982) 3113-3122; C. C. Appel, N. Bonanos, A. Horsewell, and S. Linderoth, *Ageing behaviour of zirconia stabilised by yttria and manganese oxide*, J. Mater. Sci., 36 (2001) 4493-4501; J. H. Kim and G. M. Choi, *Electrical conductivity of zirconia-Mn oxide mixture*, Materials Research Society Symposium—Proceedings, v 548, 1999, p 611-616. Proceedings of the 1998 MRS Fall Meeting—Symposium 'Solid State Ionics V', Nov. 28-Dec. 3, 1998, Boston, Mass.

TABLE 3

Relative Density of Evaluated Electrolyte Materials (with equi-molar $\alpha$-$Al_2O_3$ + $Mn_2O_3$)

| | Sample ID | | | | | | | |
|---|---|---|---|---|---|---|---|---|
| | Undoped YSZ | E0616 | E0704 | | E0704 | | E0704 | |
| Composition | TZ-8Y | 1.0 mol % Al | 1.5 mol % Mn | | 0.5 mol % Al + Mn | | 1.5 mol % Al + Mn | |
| T & P Profiles | T1, P2 | T1, P2 | XT5, XP7 | T1, P2 | XT5, XP7 | T1, P2 | XT5, XP7 | T1, P2 | XT5, XP7 |
| Porosity (%) by IA | 22.6 ± 5.5 | 12.4 ± 1.1 | 16.6 ± 2.2 | 9.8 ± 3.1 | 5.7 ± 1.3 | 11.1 ± 1.7 | 12.5 ± 2.5 | 11.6 ± 3.6 | 6.3 ± 0.9 |
| Relative Density (%) by laser* | 77 | 83 | 83 | 88 | 96 | 89 | 85** | 86 | 97 |

*Green density calibrated with E0616
**Average in two samples

TABLE 4

Electronic conductivities of doped YSZ samples (with equi-molar α-Al₂O₃ + Mn₂O₃)

| | | Air: | | | 5% H2—N2 | | |
|---|---|---|---|---|---|---|---|
| T | | 800 | 900 | 1000 | 800 | 900 | 1000 |
| 1000/T | | 0.000932 | 0.00085 | 0.00079 | 0.000932 | 0.000852515 | 0.0007855 |
| PO2/atm (on one side of disc) | | 0.024143 | 0.02903 | 0.03391 | 4.6E−20 | 5.52991E−20 | 2.778E−19 |
| PO2/atm (on the other side) | | 0.21 | 0.21 | 0.21 | 4.00E−19 | 4.00E−19 | 4.00E−19 |
| #13 (1.0 mol % Al2O3 + | σ(e) | 1.47E−05 | 3.46E−05 | 1.24E−04 | 5.42E−05 | 8.06E−05 | 9.50E−04 |
| 1.0 mol % Mn2O3 doped YSZ) | σ(t) | 3.11E−02 | 3.58E−02 | 6.48E−02 | 1.96E−02 | 3.45E−02 | 5.16E−02 |
| #4 (2 mol % Al2O3 doped YSZ) | σ(e) | 8.79E−05 | 1.20E−04 | 1.45E−04 | 4.86E−05 | 1.22E−04 | 2.86E−04 |
| | σ(t) | 2.03E−02 | 5.57E−02 | 7.38E−02 | 7.87E−03 | 9.05E−03 | Wire broken |
| #9 (2 mol % Mn2O3 doped YSZ) | σ(e) | 4.86E−05 | 1.10E−04 | 2.93E−04 | 2.59E−05 | 1.17E−04 | 6.60E−04 |
| | σ(t) | 2.23E−02 | 3.71E−02 | 4.96E−02 | 2.01E−02 | 3.64E−02 | 5.09E−02 |
| #0 (YSZ) | σ(e) | 3.46E−03 | 9.00E−03 | 1.86E−02 | 1.84E−04 | 3.09E−04 | Wire broken |
| | σ(t) | 3.81E−02 | 6.53E−02 | 8.87E−02 | 2.86E−02 | 1.65E−02 | Wire broken |

σ(e) - electronic conductivity
σ(t) - total conductivity
Unit: S · cm−1

Figure 19:
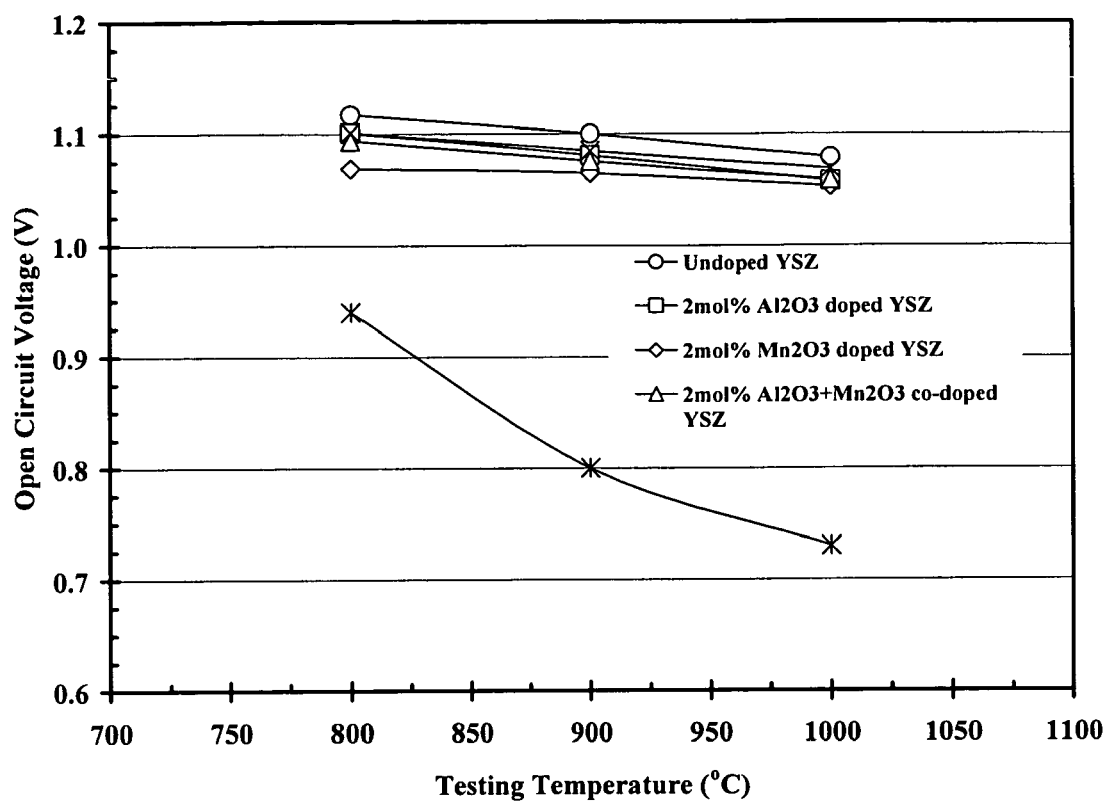
FIG. 19 is a graph of the open circuit voltages (OCV) of symmetrical cells using undoped and doped YSZ (with equi-molar α-$Al_2O_3$+$Mn_2O_3$) as the electrolytes with humidified $H_2$ (3% $H_2O$) as the fuel and air as the oxidant.

Open Circuit Voltage of Symmetrical Cells with Undoped YSZ and Doped YSZ as Electrolyte The open circuit voltage (OCV) of symmetric cells using undoped and doped YSZ as the electrolytes were measured using humidified hydrogen (3% $H_2O$) as the fuel and air as the oxidant. Undoped YSZ (Sample #0) and samples with the highest dopant level (2 mol %) in the three series (Sample #4, #9 and #13) were selected for this study. Samples with a diameter of 30 mm and a thickness of 1 mm were separately sintered pressurelessly at 1380° C. for 1 hr for Sample #0, 1330° C. for 1 hr for Sample #4, 1275° C. for 1 hr for both Sample #9 and #13, based on their dilatometry curves. A relative density of 99% for Sample #0, 97% for Sample #4, 99% for Sample #9, and 98% for Sample #13, respectively, was achieved after sintering. A platinum paste was applied on both surfaces of the sintered disks to get symmetric cells and then the open circuit voltages of the cells were measured in 800, 900, and 1000° C. using humidified hydrogen (3% $H_2O$) as the fuel and air as the oxidant. The results are shown in both Table 5 and FIG. 19. Data from thermodynamic calculation (theoretical OCV based on $H_2$+3% $H_2O$ fuel and air) and 1.0 mol % Mn+Co co-doped electrolyte from a previous study are included in Table 5 and FIG. 19 for comparison. As shown in Table 5 and FIG. 19, both undoped YSZ (Sample #0) and doped YSZs (Samples #4, #9, and #13) in this study showed very high OCV under the testing conditions, which are very close to the theoretical OCV. The decrease of OCV with an increase in temperature is due to purely thermodynamic behavior, not caused by the reduction of the dopant, such as, for example, 1.0 mol % Mn+Co co-doped electrolyte, causing a short circuit. All the doped YSZs in this study are good electrolyte materials based on the above results.

CONCLUSIONS

1. The sintering temperature and densification behavior of 8 mol % yttria stabilized zirconia (YSZ) can be significantly reduced and modified by adding one or two ultrafine cation dopants in a conventional ceramic process.

2. A small amount of ultrafine-α-$Al_2O_3$, $Mn_2O_3$ doping, and α-$Al_2O_3$+$Mn_2O_3$ co-doping can significantly reduce the peak temperature of the (dL/dT) curve and the maximum shrinkage rate of YSZ. The peak temperature ($T_{peak}$) of pure YSZ can be reduced over 207° C. with 0.5 mol % α-$Al_2O_3$+ 1.5 mol % $Mn_2O_3$ co-doping and the maximum shrinkage rate of YSZ can be reduced from 0.11 to 0.08, dilatometry dL/dT full width half maximum (FWHM) can be increased over 100° C. with 2.0 mol % $Mn_2O_3$ doping.

3. A small amount of $Al_2O_3$, $Mn_2O_3$ doping, and α-$Al_2O_3$+ $Mn_2O_3$ co-doping do not increase the electronic conductivity of YSZ, such as, for example, Tosoh TZ-8Y. Therefore, the open circuit voltage of cells using the doped YSZ as the electrolytes will be as good as using undoped YSZ.

4. It becomes possible to densify the YSZ electrolyte at 1150~1200° C. with α-$Al_2O_3$+$Mn_2O_3$ co-doping.

The teachings of all patents, published applications and references cited herein are incorporated by reference in their entirety.

EQUIVALENTS

While this invention has been particularly shown and described with references to example embodiments thereof, it will be understood by those skilled in the art that various

TABLE 5

Open circuit voltages (OCV, Volt) of symmetrical cells using undoped and doped YSZ (with equi-molar α-Al₂O₃ + Mn₂O₃) as the electrolytes with humidified H₂ (3% H₂O) as the fuel and air as the oxidant.

| | Open Circuit Voltage (V) | | | | | |
|---|---|---|---|---|---|---|
| Temp. (C.) | Theoretical OCV | Undoped YSZ | 2 mol % α-Al₂O₃ doped YSZ | 2 mol % Mn₂O₃ doped YSZ | 2 mol % α-Al₂O₃ + Mn₂O₃ co-doped YSZ | 1 mol % Mn + Co co-doped YSZ |
| 800 | 1.101 | 1.117 | 1.101 | 1.069 | 1.094 | 0.94 |
| 900 | 1.085 | 1.1 | 1.081 | 1.065 | 1.076 | 0.8 |
| 1000 | 1.069 | 1.079 | 1.058 | 1.053 | 1.059 | 0.73 |

What is claimed is:

1. A method for forming an electrolyte of a solid oxide fuel cell, comprising the steps of:
   a) combining an yttria-stabilized zirconia powder with $\alpha\text{-Al}_2\text{O}_3$ having a $d_{50}$ particle size in a range of between about 10 nm and about 200 nm and $Mn_2O_3$ having a $d_{50}$ of the $Mn_2O_3$ is in a range of between about 50 nm and about 400 nm to form an electrolyte precursor composition; and
   b) sintering the electrolyte precursor composition to thereby form the electrolyte.

2. The method of claim 1, wherein the $\alpha\text{-Al}_2\text{O}_3$ and $Mn_2O_3$ are present in the electrolyte precursor composition in an amount in a range of between about 0.25 mol % and about 5 mol %.

3. The method of claim 2, where in the $\alpha\text{-Al}_2\text{O}_3$ and $Mn_2O_3$ is present in the electrolyte precursor in an amount of about 2 mol %.

4. The method of claim 3, wherein the composition of the yttria-stabilized zirconia powder includes at least one of: yttria in an amount between about 3% and about 10 mol % of the powder; and zirconia in an amount between about 97 mol % and about 90 mol % of the powder.

5. The method of claim 4, wherein yttria is present in the yttria-stabilized zirconia powder in an amount of about 8 mol %.

6. The method of claim 5, wherein the $d_{50}$ particle size of the yttria-stabilized zirconia powder is in a range of between about 0.05 µm and about 1 µm.

7. The method of claim 1, wherein the ratio of $\alpha\text{-Al}_2\text{O}_3$:$Mn_2O_3$ is in a range of between about 0.25:1 to about 1:0.25.

8. The method of claim 1, wherein the d50 of the $\alpha\text{-Al}_2\text{O}_3$ is about 50 nm.

9. The method of claim 1, wherein the specific surface area of $\alpha\text{-Al}_2\text{O}_3$ is in a range of between about 5 $m^2/g$ and about 30 $m^2/g$.

10. The method of claim 9, wherein the specific surface area of the $\alpha\text{-Al}_2\text{O}_3$ is about 17 m2/g.

11. The method of claim 1, wherein the $d_{50}$ of the $Mn_2O_3$ is about 200 nm.

12. The method of claim 11, wherein the specific surface area of the $Mn_2O_3$ is in a range of between about 10 $m^2/g$ and about 50 $m^2/g$.

13. The method of claim 12, wherein the specific surface area of $Mn_2O_3$ is about 32 $m^2/g$.

14. The method of claim 1, wherein the $d_{50}$ of the yttria-stabilized zirconia (YSZ) powder is in a range of between about 50 nm and about 1000 nm.

15. The method of claim 14, wherein the $d_{50}$ of the YSZ is about 250 nm.

16. The method of claim 15, wherein the specific surface area of the YSZ is in a range of between about 5 $m^2$ g and about 30 $m^2/g$.

17. The method of claim 16, wherein the specific surface area of the YSZ is about 13 m2/g.

* * * * *

UNITED STATES PATENT AND TRADEMARK OFFICE
CERTIFICATE OF CORRECTION

PATENT NO. : 8,357,474 B2  Page 1 of 1
APPLICATION NO. : 12/653661
DATED : January 22, 2013
INVENTOR(S) : Yeshwanth Narendar et al.

It is certified that error appears in the above-identified patent and that said Letters Patent is hereby corrected as shown below:

In the Claims

Column 15, line 20, claim 3, please delete "where in" and insert --wherein--.
Column 16, line 6, claim 8, please delete "d50" and insert --$d_{50}$--.
Column 16, line 12, claim 10, please delete "m2/g" and insert --$m^2/g$--.
Column 16, line 26, claim 16, please delete "$m^2$ g" and insert --$m^2/g$--.
Column 16, line 29, claim 17, please delete "m2/g" and insert --$m^2/g$--.

Signed and Sealed this
Fourteenth Day of October, 2014

Michelle K. Lee
*Deputy Director of the United States Patent and Trademark Office*